(12) United States Patent
Bhamri et al.

(10) Patent No.: US 12,542,594 B2
(45) Date of Patent: Feb. 3, 2026

(54) APPARATUS AND METHOD OF COMMUNICATING ON DIFFERENT BEAMS

(71) Applicant: Lenovo (Singapore) Pte. Ltd., New Tech Park (SG)

(72) Inventors: Ankit Bhamri, Bad Nauheim (DE); Robin Thomas, Frankfurt (DE); Ali Ramadan Ali, Kraiburg (DE); Karthikeyan Ganesan, Kronberg (DE); Sher Ali Cheema, Kopernikusstrasse (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 353 days.

(21) Appl. No.: 18/033,071

(22) PCT Filed: Oct. 21, 2021

(86) PCT No.: PCT/US2021/055929
§ 371 (c)(1),
(2) Date: Apr. 21, 2023

(87) PCT Pub. No.: WO2022/087190
PCT Pub. Date: Apr. 28, 2022

(65) Prior Publication Data
US 2023/0396307 A1   Dec. 7, 2023

Related U.S. Application Data

(60) Provisional application No. 63/105,112, filed on Oct. 23, 2020.

(51) Int. Cl.
H04B 7/06    (2006.01)
H04B 7/08    (2006.01)

(52) U.S. Cl.
CPC ..... H04B 7/06952 (2023.05); H04B 7/06966 (2023.05); H04B 7/088 (2013.01)

(58) Field of Classification Search
CPC ..... H04L 1/1642; H04L 47/34; H04L 1/1607; H04W 28/06; H04W 28/082;
(Continued)

(56) References Cited

U.S. PATENT DOCUMENTS 11,510,212 B2 *  11/2022  Rahman ................ H04L 5/0051
2014/0010080 A1 *  1/2014  Zubow ................ H04B 7/0417
                                                              370/230
(Continued)

FOREIGN PATENT DOCUMENTS

EP          2930966 A1 *  10/2015  ........... H01Q 3/2605

OTHER PUBLICATIONS

Yu-Ngok Ruyue Li, "Beam Management in Millimeter-Wave Communications for 5G and Beyond", IEEE Access, Jan. 1, 2020.
(Continued)

*Primary Examiner* — Nathan S Taylor
(74) *Attorney, Agent, or Firm* — FIG. 1 Patents

(57) ABSTRACT

A transceiver (1070) can receive a configuration of multiple beams, a respective duration of validity of each of the beams for an apparatus (1000), and an indication of location related information, where the beams provide communication between the apparatus (1000) and a network entity. A controller (1020) can determine a set of the multiple beams to apply for communications based on at least the location related information and the duration of validity of each beam. The transceiver (1070) can communicate on different beams of the set of the beams at different time instances based on at least the location related information and the duration of validity of each beam.

20 Claims, 10 Drawing Sheets

(58) Field of Classification Search
CPC . H04W 28/0865; H04W 28/09; H04W 76/15; H04W 88/06; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20; H04B 7/0695; H04B 7/06966; H04B 7/088; H04B 7/06; H04B 7/08

See application file for complete search history.

(56) References Cited

U.S. PATENT DOCUMENTS

| | | | | |
|---|---|---|---|---|
| 2017/0251388 | A1* | 8/2017 | Persson | H04W 24/10 |
| 2018/0241442 | A1* | 8/2018 | Zirwas | H04B 7/0469 |
| 2020/0022126 | A1* | 1/2020 | You | H04L 5/0053 |
| 2020/0374960 | A1* | 11/2020 | Deenoo | H04B 7/088 |
| 2020/0374966 | A1* | 11/2020 | Chang | H04W 74/0833 |
| 2021/0076391 | A1* | 3/2021 | Davydov | H04L 5/0057 |
| 2022/0022180 | A1* | 1/2022 | Rahman | H04L 5/0048 |
| 2022/0149922 | A1* | 5/2022 | Wang | H04W 76/19 |
| 2022/0159589 | A1* | 5/2022 | Yu | H04L 1/1874 |
| 2022/0169401 | A1* | 6/2022 | Di Cosola | B64U 70/95 |
| 2022/0286868 | A1* | 9/2022 | Kim | H04L 1/0075 |

OTHER PUBLICATIONS

Rezaie, Shajad, "Location- and Orientation-Aided Millimeter Wave Beam Selection Using Deep Learning", IEEE Xplore, ICC 2020-2020 IEEE International Conference on Communications (ICC), Jun. 7-11, 2020, Dublin, Ireland.

ZTE, "Applications of Artificial Intelligence in MIMO Networks", RP-201771, 3GPP TSG RAN Meeting #89e, Electronic Meeting, Sep. 14-18, 2020.

* cited by examiner

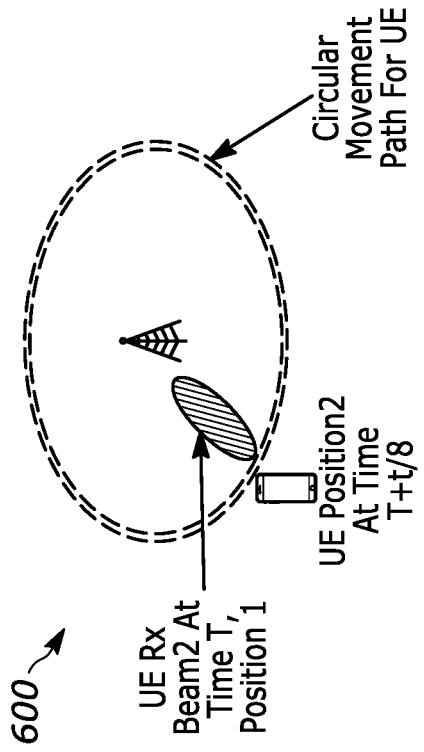
FIG. 6B
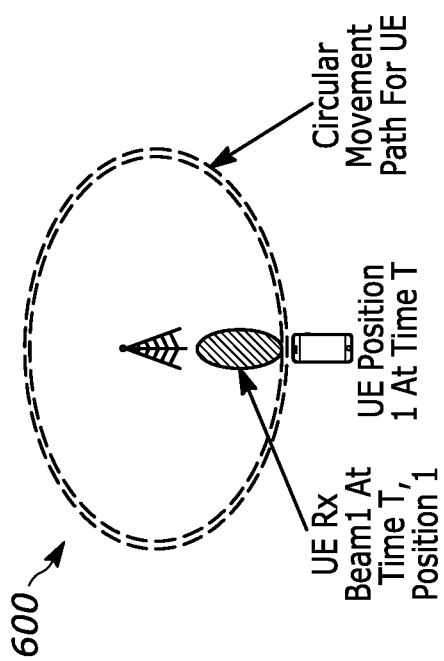
FIG. 6A
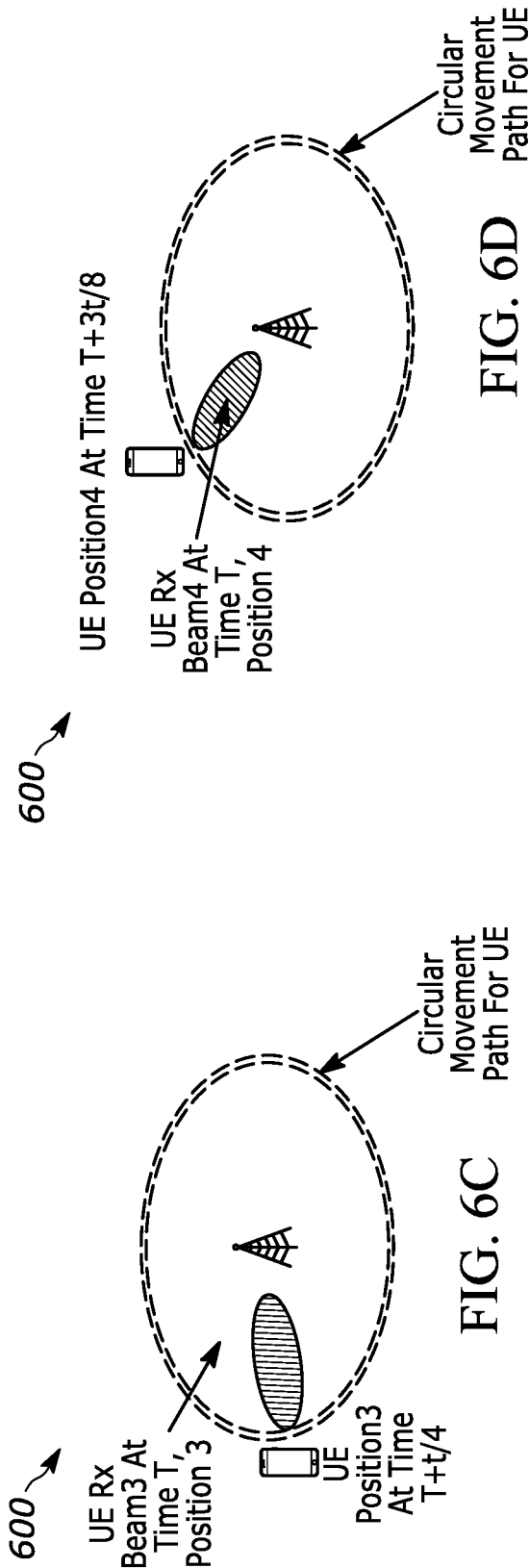
FIG. 6D
FIG. 6C

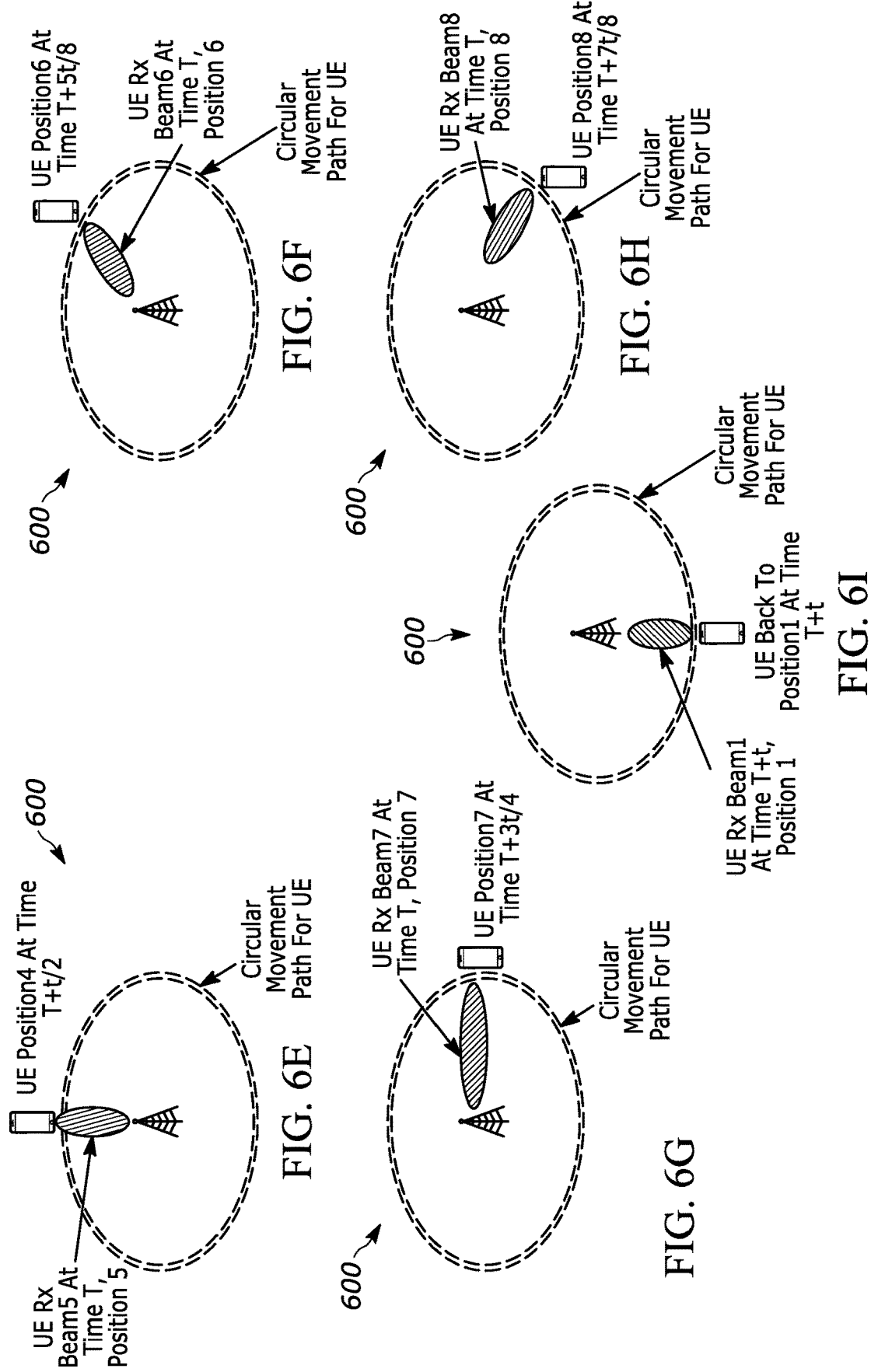

APPARATUS AND METHOD OF COMMUNICATING ON DIFFERENT BEAMS

BACKGROUND

1. Field

The present disclosure is directed to an apparatus and method of communicating on different beams. More particularly, the present disclosure is directed to communicating on different beams at different time instances based on determining or predicting the beams corresponding to movement and/or orientation of the device.

2. Introduction

Presently, wireless communication devices, such as UEs, communicate with other communication devices using wireless signals. In NR Rel-15/16, beam-management procedures including initial beam acquisition, beam training, beam refinement and beam failure recovery rely heavily on constant and/or periodic exchange of reference signals and corresponding measurement reporting between the network and UE for both UL and DL control/data channel transmissions. Consequently, the latency and overhead involved for such procedures is quite high. Moreover, the issues are expected to be further escalated for higher frequency ranges where the beams would be required to be very narrow in order to serve different use cases.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIGS. 6A-I are example illustrations of a system showing periodic beam switching for circular path UE or rotating UE according to a possible embodiment;

DETAILED DESCRIPTION

Embodiments provide a method and apparatus for communicating on a wireless network. At least some embodiments can provide a method and signaling for communicating on different beams at different time instances. At least some embodiments can provide predictive beamforming for high frequency range communications. According to a possible embodiment, a transceiver can receive a configuration of multiple beams, a respective duration of validity of each of the beams for the apparatus, and/or an indication of location related information, where the beams provide communication between the apparatus and a network entity. A controller can determine a set of the multiple beams to apply for communications based on at least the location related information and the duration of validity of each beam. The transceiver can communicate on different beams of the set of the beams at different respective time instances based on at least the location related information and the duration of validity of each beam.

Figure 1:
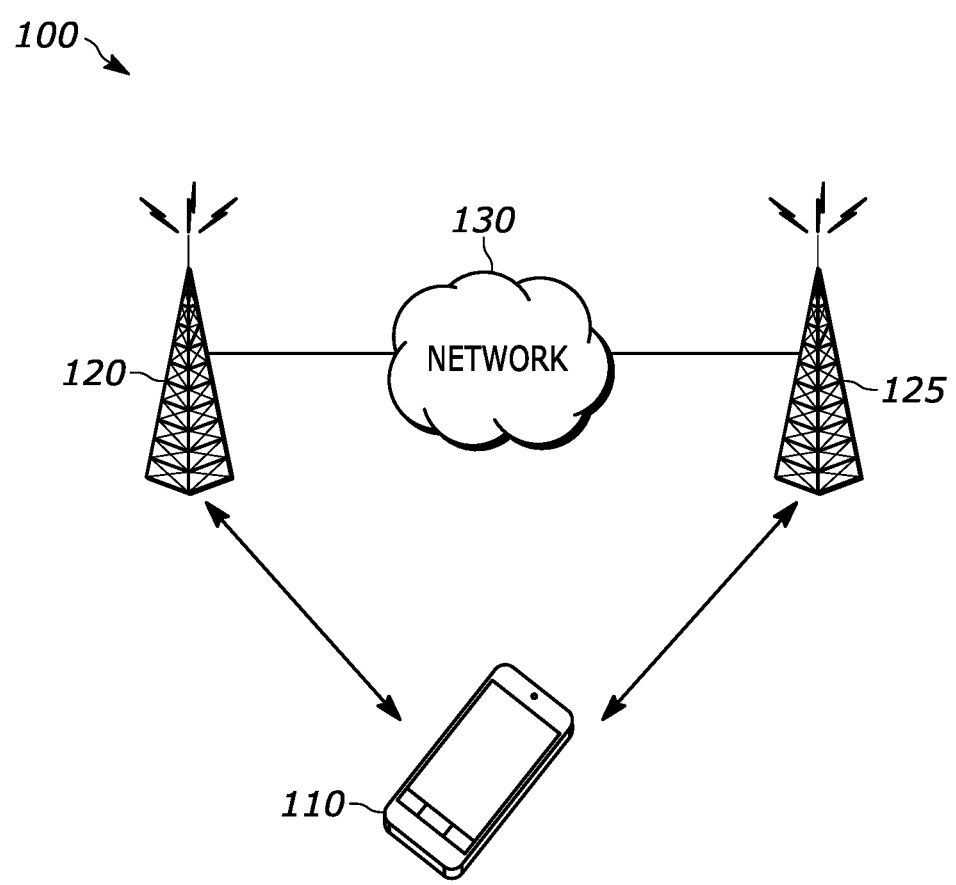
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an IoT device, or any other user device that is capable of sending and receiving communication signals on a wireless network. The at least one network entity 120 and 125 can be a wireless wide area network base station, can be a NodeB, can be an eNB, can be a gNB, such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a TDMA-based network, a CDMA-based network, an OFDMA-based network, an LTE network, a NR network, a 3GPP-based network, a 5G network, a satellite communications network, a high-altitude platform network, the Internet, and/or other communications networks.

In operation, the UE 110 can communicate with the network 130 via at least one network entity 120. For example, the UE 110 can send and receive control signals on a control channel and user data signals on a data channel.

Figure 2:
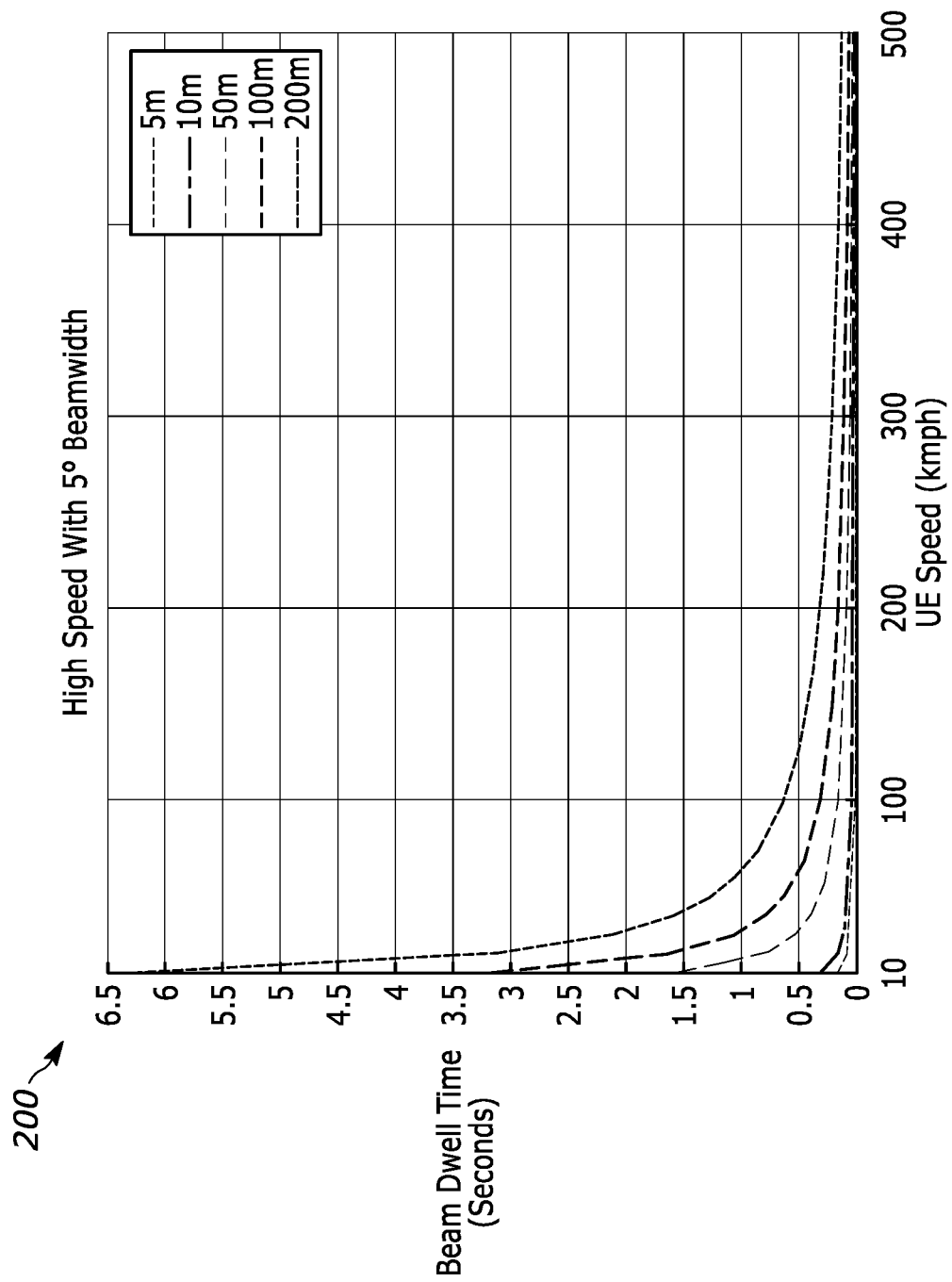
FIGS. 2-4 are example graphs illustrating examples of beam dwelling time according to possible embodiments.
Figure 3:
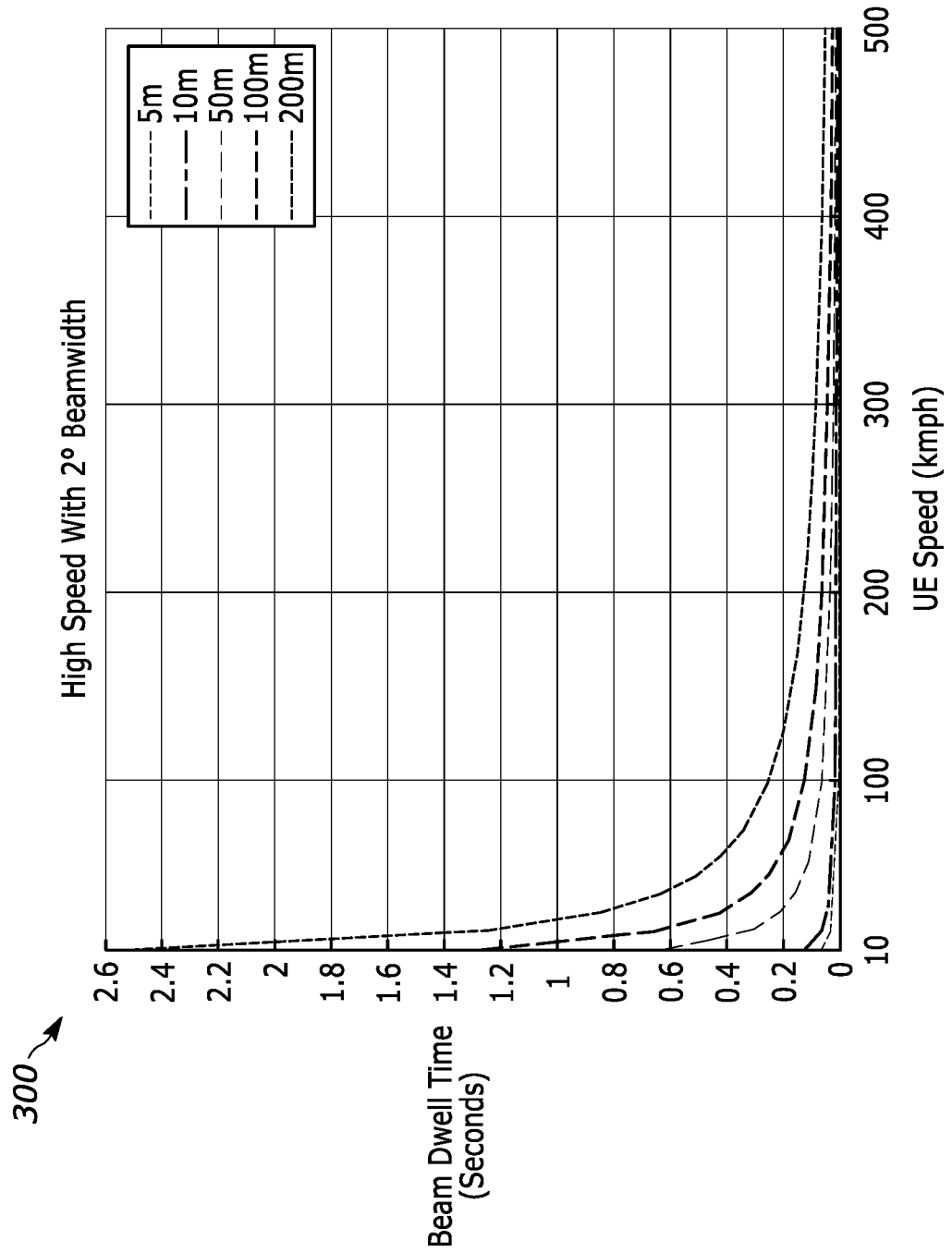
Figure 4:
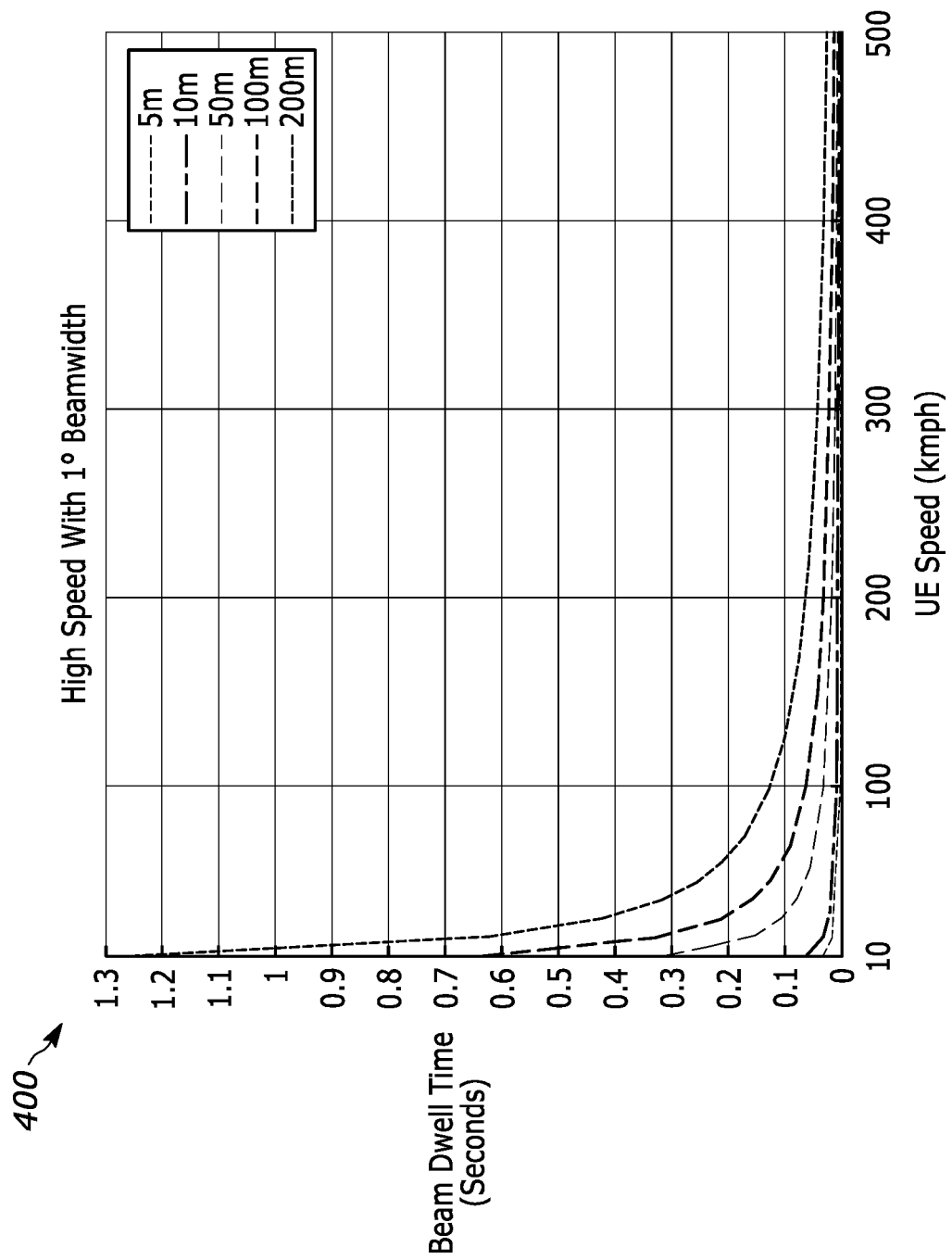

FIGS. 2-4 are example graphs 200, 300, and 400 illustrating examples of beam dwelling time depending upon UE speed and distance from a TRP for narrow beams according to possible embodiments. Beam dwelling time can be used and an indication of the duration for which a beam can be used for communication. The graph 200 illustrates minimum beam dwell time for 5° according to a possible embodiment. For 5 m coverage and 500 kmph mobility, the dwell time can be 3 ms. The graph 300 illustrates minimum beam dwell time for 2° according to a possible embodiment. For 5 m coverage and 500 kmph mobility, the dwell time can be 1.2 ms. The graph 400 illustrates minimum dwell time for 1° according to a possible embodiment. For 5 m coverage and 500 kmph mobility, the dwell time can be 0.6 ms. Depending up on the distance from the TRPs and beam width, the beam dwelling time can be as low as under 5 ms.

Embodiments can address issues related to beam management of a UE or set of UEs that traverse a predetermined, predicted, and/or expected route and/or orientation. Currently, there are no specified solutions for efficiently managing the TX and RX beam coordination for a UE, based on the expected and/or repeated location of the UE. In order to enable low latency, accurate and efficient beam-based transmissions for mobile UEs, especially in FR2 and beyond, physical layer procedures can be based on the periodic transmissions of reference signals and/or 2D or 3D position and/or movement of the UE. Embodiments can relate to the beam dwelling time and the dynamic movement, such as speed, orientation, and/or other movement characteristics of the UE.

Figure 5:
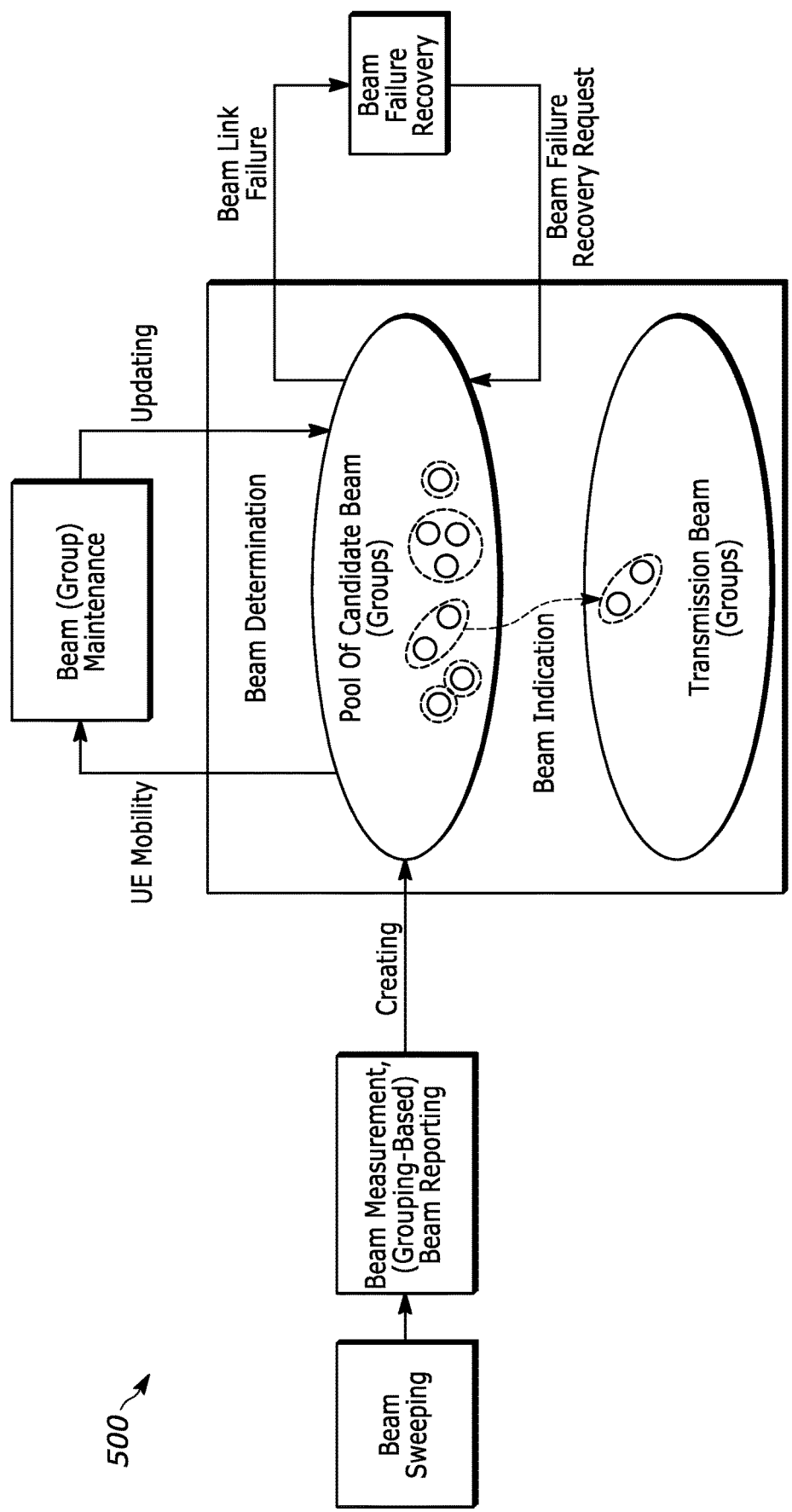
FIG. 5 is an example illustration of beam-management procedures in NR according to a possible embodiment.

FIG. 5 is an example illustration 500 of beam-management procedures in NR according to a possible embodiment. For beam-management in NR Rel-15/16, different beam-management procedures in 3GPP NR can be used. Beam management is defined as a set of Layer 1/2 procedures to acquire and maintain a set of beam pair links, i.e., a beam used at TRP(s) for a BS side paired with a beam used at a UE. The beam pair links can be used for DL and UL transmission/reception. The beam management procedures include at least the following six aspects. A first aspect of beam management can be based on beam sweeping: operation of covering a spatial area, with beams transmitted and/or received during a time interval in a predetermined way. A second aspect of beam management can be based on beam measurement: for TRP(s) or a UE to measure characteristics of received BF signals. A third aspect of beam management can be based on beam reporting: for a UE to report information of BF signal(s) based on beam measurement. A fourth aspect of beam management can be based on beam determination: for TRP(s) or a UE to select of its own Tx/Rx beam(s). A fifth aspect of beam management can be based on beam maintenance: for TRP(s) or a UE to maintain the candidate beams by beam tracking or refinement to adapt to the channel changes due to UE movement or blockage. A sixth aspect of beam management can be based on beam recovery: for a UE to identify new candidate beam(s) after detecting beam failure and subsequently inform TRP of beam recovery request with information of indicating the new candidate beam(s).

For UL beam-management in NR Rel-15/16, according to 3GPP TS 38.214, two transmission schemes, codebook-based transmissions and non-codebook-based transmissions, are supported for PUSCH. For PUSCH transmission(s) dynamically scheduled by an UL grant in a DCI, a UE shall upon detection of a PDCCH with a configured DCI format 0_0 or 0_1 transmit the corresponding PUSCH as indicated by that DCI.

For PUSCH scheduled by DCI format 0_0 on a cell, the UE shall transmit PUSCH according to the spatial relation, if applicable, corresponding to the physical uplink control channel (PUCCH) resource with the lowest identity (ID) within the active UL BWP of the cell, and the PUSCH transmission is based on a single antenna port. A spatial setting for a PUCCH transmission is provided by higher layer parameter PUCCH-SpatialRelationInfo if the UE is configured with a single value for higher layer parameter pucch-SpatialRelationInfoId; otherwise, if the UE is provided multiple values for higher layer parameter PUCCH-SpatialRelationInfo, the UE determines a spatial setting for the PUCCH transmission based on a received PUCCH spatial relation activation/deactivation MAC CE as described in 3GPP TS 38.321. The UE applies a corresponding setting for a spatial domain filter to transmit PUCCH 3 msec after the slot where the UE transmits HARQ-ACK information with ACK value corresponding to a PDSCH reception providing the PUCCH-SpatialRelationInfo.

For codebook-based transmission, PUSCH can be scheduled by DCI format 0_0 or DCI format 0_1. If a PUSCH is scheduled by DCI format 01, the UE determines its PUSCH transmission precoder based on SRI, TPMI and the transmission rank from the DCI, given by DCI fields of SRS resource indicator and precoding information and number of layers in subclause 7.3.1.1.2 of 3GPP TS 38.212. The TPMI is used to indicate the precoder to be applied over the antenna ports $\{0 \ldots v-1\}$ and that corresponds to the SRS resource selected by the SRI (unless a single SRS resource is configured for a single SRS-ResourceSet set to 'codebook'). The transmission precoder is selected from the uplink codebook that has a number of antenna ports equal to higher layer parameter nrofSRS-Ports in SRS-Config, as defined in Subclause 6.3.1.5 of 3GPP TS 38.211. When the UE is configured with the higher layer parameter xConfig set to 'codebook', the UE is configured with at least one SRS resource. The indicated SRI in slot n is associated with the most recent transmission of SRS resource identified by the SRI, where the SRS resource is prior to the PDCCH carrying the SRI before slot n. The UE determines its codebook subsets based on TPMI and upon the reception of higher layer parameter codebookSubset in PUSCH-Config which may be configured with 'fullyAndPartialAndNonCoherent' or 'partialAndNonCoherent', or 'nonCoherent' depending on the UE capability. The maximum transmission rank may be configured by the higher parameter maxRank in PUSCH-Config.

For non-codebook-based transmission, PUSCH can be scheduled by DCI format 0_0 or DCI format 0_1. The UE can determine its PUSCH precoder and transmission rank based on the wideband SRI when multiple SRS resources are configured in an SRS resource set with higher layer parameter usage in SRS-ResourceSet set to 'nonCodebook', where the SRI is given by the SRS resource indicator in DCI format 0_1 according to subclause 7.3.1.1.2 of 3GPP TS 38.212 and only one SRS port is configured for each SRS resource. The indicated SRI in slot n is associated with the most recent transmission of SRS resource(s) identified by the SRI, where the SRS transmission is prior to the PDCCH carrying the SRI before slot n.

The UE shall perform one-to-one mapping from the indicated SRI(s) to the indicated DM-RS ports(s) given by DCI format 0_1 in increasing order.

In Rel-16 3GPP NR, for PUSCH scheduled by DCI format 0_0 on a cell and if the higher layer parameter enableDefaultBeamPlForPUSCH0_0 is set 'enabled', the UE is not configured with PUCCH resources on the active UL BWP and the UE is in RRC connected mode, the UE shall transmit PUSCH according to the spatial relation, if applicable, with a reference to the RS with 'QCL-Type-D' corresponding to the QCL assumption of the CORESET with the lowest ID. For PUSCH scheduled by DCI format 0_0 on a cell and if the higher layer parameter enableDefaultBeamPlForPUSCH0_0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS with 'QCL-Type-D' corresponding to the QCL assumption of the CORESET with the lowest ID in case CORESET(s) are configured on the CC.

According to 3GPP Rel-16 TS 38.214, Rel-16 NR supports a MAC CE based spatial relation update for aperiodic SRS per resource level and a default UL beam for an SRS resource for latency and overhead reduction in UL beam management.

For DL beam-management for NR Rel-15/16 CSI reporting, one possibility to handling CSI reporting feedback for beam management is to use group-based beam reporting. However, due to no association with TRPs, the benefit is only limited to reduce overhead from feedback point of view and TRP-based beam management may not benefit much. According to section 5.2.1.4 of 3GPP TS 38.214 (v16.0.0), following is specified in terms of CSI reporting: If the UE is configured with a CSI-ReportConfig with the higher layer parameter reportQuantity set to 'cri-RSRP' or 'ssb-Index-RSRP', if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting. Also, if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

The following is also specified in terms of CSI reporting: If the UE is configured with a CSI-ReportConfig with the higher layer parameter reportQuantity set to 'cri-SINR' or 'ssb-Index-SINR', if the UE is configured with the higher layer parameter groupBasedBeamReporting set to 'disabled', the UE shall report (in a single report) nrofReportedRSForSINR (higher layer configured) different CRI or SSBRI for each report setting. Also, if the UE is configured with the higher layer parameter groupBasedBeamReporting set to 'enabled', the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

For QCL assumptions, according to current specification, there is only one QCL type, i.e., qcl-TypeD for spatial relation between the source RS and target RS. This means that only a single source to single target beam association can be established. However, in higher frequencies, the number of beams can become a lot higher, therefore, more coarse association can be considered to cover wider areas. Also, from TCI indication point of view, there was a revision in Rel. 16 to indicate up to two TCI states corresponding to two TRPs. However, this is still quite limited when there could be possibly higher number of TRPs for FR2 and beyond.

According to section 5.1.5 of 3GPP TS 38.214 (v16.0.0), following is specified in terms of QCL assumptions:

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

The UE receives an activation command, as described in clause 6.1.3.14 of TS 38.321 or in clause 6.1.3.x of TS 38.321, used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command, as described in clause 6.1.3.X of TS 38.321, the activation command is used to map up to 8 combinations of one or two TCI states to the codepoints of the DCI field 'Transmission Configuration Indication'. The UE is not expected to receive more than 8 TCI states in the activation command.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $n+3N^{subframe,\mu}_{slot}$, where $\mu$ is the slot SCS configuration for the PUCCH. If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If a UE is configured with the higher layer parameter tci-PresentInDCI-ForFormat1_2 for the CORESET scheduling the PDSCH, the UE assumes that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability in TS 38.306, for determining PDSCH antenna port quasi co-location, the UE assumes that the TCI state or the QCL assumption for the PDSCH is identical to the TCI state or QCL assumption whichever is applied for the CORESET used for the PDCCH transmission.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability in TS 38.306. When the UE is configured with a single slot PDSCH, the indicated TCI state should be based on the activated TCI states in the slot with the scheduled PDSCH. When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling, and the PDCCH carrying the scheduling DCI and the PDSCH scheduled by that DCI are transmitted on the same carrier, the UE expects tci-PresentInDCI is set as 'enabled' or tci-PresentInDCI-ForFormat1_2 is configured for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold timeDurationForQCL.

Independent of the configuration of tci-PresentInDCI and tci-PresentInDCI-ForFormat1_2 in RRC connected mode, if all the TCI codepoints are mapped to a single TCI state and the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If none of configured TCI states for the serving cell of scheduled PDSCH contains 'QCL-TypeD', the UE shall obtain the other QCL assumptions from the indicated TCI states for its scheduled PDSCH irrespective of the time offset between the reception of the DL DCI and the corresponding PDSCH. If a UE configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE. If the offset between the reception of the DL DCI and the corresponding PDSCH is less than the threshold timeDurationForQCL and at least one configured TCI state for the serving cell of scheduled PDSCH contains the 'QCL-TypeD', and at least one TCI codepoint indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

If the PDCCH carrying the scheduling DCI is received on one component carrier, and the PDSCH scheduled by that DCI is on another component carrier: the timeDurationForQCL is determined based on the subcarrier spacing of the scheduled PDSCH. If $\mu PDCCH < \mu PDSCH$ an additional timing delay d is added to the timeDurationForQCL, where d is defined in the technical specification at 5.2.1.5.1a-1; for both the cases when tci-PresentInDCI is set to 'enabled' and the offset between the reception of the DL DCI and the corresponding PDSCH is less than the threshold timeDurationForQCL and when tci-PresentInDCI is not configured, the UE obtains its QCL assumption for the scheduled PDSCH from the activated TCI state with the lowest ID applicable to PDSCH in the active BWP of the scheduled cell.

For a periodic CSI-RS resource in an NZP-CSI-RS-ResourceSet configured with higher layer parameter trs-Info, the UE shall expect that a TCI-State indicates one of the following quasi co-location type(s): 'QCL-TypeC' with an SS/PBCH block and, when applicable, 'QCL-TypeD' with the same SS/PBCH block, or 'QCL-TypeC' with an SS/PBCH block and, when applicable, 'QCL-TypeD' with a CSI-RS resource in an NZP-CSI-RS-ResourceSet configured with higher layer parameter repetition, or for an aperiodic CSI-RS resource in a NZP-CSI-RS-ResourceSet configured with higher layer parameter trs-Info, the UE shall expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with an SS/PBCH block, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeC' with an SS/PBCH block and, when applicable, 'QCL-TypeD' with the same SS/PBCH block.

For the DM-RS of PDCCH, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For beam management in NR, for Rel.17 NR FeMIMO, on the unified TCI framework, joint TCI for DL and UL can be supported based on and analogous to Rel. 15/16 DL TCI framework. The term "TCI" at least comprises a TCI state that includes at least one source RS to provide a reference (UE assumption) for determining QCL and/or spatial filter. The source reference signal(s) in M TCIs provide common QCL information at least for UE-dedicated reception on PDSCH and all or subset of CORESETs in a CC. Optionally, this common QCL information can potentially also apply to CSI-RS resource for CSI, CSI-RS resource for beam management, and CSI-RS for tracking. Applicability on PDSCH potentially includes PDSCH default beam. The value for M can be selected between M=1 and M>=1. The source reference signal(s) in N TCIs provide a reference for determining common UL TX spatial filter(s) at least for dynamic-grant/configured-grant based PUSCH, all or subset of dedicated PUCCH resources in a CC. Optionally, this UL TX spatial filter can also apply to all SRS resources in resource set(s) configured for antenna switching/codebook-based/non-codebook-based UL transmissions. This UL TX spatial filter can potentially be applied to SRS configured for beam management. PUSCH port determination can potentially be based on the TCI, e.g., to be mapped with SRS ports analogous to Rel.15/16. The value for N can be selected between N=1 and N>=1. It may be possible to extension this to common QCL information applied to only some of the CORESETs or PUCCH resources in a CC, e.g., for mTRP. When used for the purpose of joint beam indication for UL and DL, potentially either a joint TCI pool for DL and UL dedicated for the purpose is used, or the same TCI pool as that used for the purpose of separate DL/UL beam indication is used. The resulting beam indication directly refers to the associated source RS(s). This can potentially be extended to intra- and inter-band CA. The supported number of active TCI states can potentially consider factors such as multi-TRP and beam acquisition latency reduction. This can be applicable QCL types, and co-existence can potentially exist with DL TCI and spatial relation indication in Rel.15/16.

For the purpose of down selection, the following alternatives can potentially be used for accommodating the case of separate beam indication for UL and DL. For a first alternative, utilize the joint TCI to include references for both DL and UL beams. For a second alternative, utilize two separate TCI states, one for DL and one for UL. The TCI state for the DL is the same as agreed in 1a. The TCI state for the UL can be newly introduced. In an example of the second alternative, the UL TCI state is taken from the same pool of TCI states as the DL TCI state. In another example of the second alternative, the UL TCI state is taken from another pool of TCI states than the DL TCI state. The resulting beam indication directly refers to the associated source RS(s). These concepts can be extended to intra- and inter-band CA. This may be related to discussions below as well as other reasons for different TCIs such as network flexibility/scheduling.

The use of SSB/CSI-RS can be supported for beam management and/or SRS for beam management as source RS to determine a UL TX spatial filter in the unified TCI framework. Whether the UL TX spatial filter corresponds to UL TCI (separate from DL TCI) depends on the outcome of accommodating the case of separate beam indication for UL and DL. The use of non-beam management CSI-RS and/or non-beam management SRS can be supported.

SRS for beam management may be configured as a source RS to represent a DL RX spatial filter in the unified TCI framework. Other parameters can be included in or concurrent with (but not included in) the TCI, e.g., UL-PC-related parameters (involving PO/alpha, PL RS, and/or closed loop index), UL-timing-related parameters, and/or other parameters. Alignment between DL and UL default beam assumptions can use the unified TCI framework.

For Rel.17 NR FeMIMO, scope and use cases for L1/L2-centric inter-cell mobility can include applicability in various non-CA and CA setups such as intra-band and inter-band CA; use cases in comparison to Rel.15 L3-based HO taking into account potential extension of DAPS-based Rel.16 mobility enhancement to FR2-FR2 HO; the extent of RAN2 impact (MAC CE, RRC, user plane protocols); and network architecture, e.g., NSA vs. SA, inter-RAT scenarios. Additional components along with the associated alternatives required can be identified for supporting inter-cell mobility can be identified based on the same unified TCI framework as that for intra-cell mobility (including dynamic TCI state update signalling), including: method(s) for incorporating non-serving cell information associated with TCI; method(s) for DL measurements and UE reporting (e.g. L1-RSRP) associated with non-serving cell(s); UE behavior for reception of signals and non-UE-specific control and data channels associated with non-serving cell(s); UL-related enhancements, e.g. related to RA procedure including TA; beam-level event-driven mechanism for L1/L2-centric inter-cell mobility.

For Rel.17 NR FeMIMO, on dynamic TCI state update signalling medium: In for down selection, the following alternatives can be considered: DCI and/or MAC CE. A combination between DCI and MAC CE for, e.g., different use cases or control information partitioning can also be used. Factors can be considered, such as feasibility for pertinent use cases, performance (based on at least the agreed EVM), overhead (including PDCCH capacity), latency, flexibility, reliability including the support of retransmission. Candidates for more detailed design issues for the dynamic TCI state update can include exact content, signalling format, reliability aspects including the support of retransmission, extensions, including the support of UE-group (in contrast to UE-dedicated) signalling, and/or other candidates.

For Rel.17 NR FeMIMO, on MP-UE assumption to facilitate fast UL panel selection, the following assumptions are used: in terms of RF functionality, a UE panel comprises a collection of TXRUs that is able to generate one analog beam (one beam may correspond to two antenna ports if dual-polarized array is used); UE panels can constitute the same as well as different number of antenna ports, number of beams, and EIRP; no beam correspondence across different UE panels; for each UE panel, it can comprise an independent unit of PC, FFT timing window, and/or TA; same or different sets of UE panels can be used for DL reception and UL transmission, respectively. Candidate use cases including MPE can be identified, and remaining aspects can be considered if use cases are identified. Candidate signalling schemes can be identified for the following: NW to MP-UE (taking into account potential extension of the unified TCI framework in issue 1); and MP-UE to NW.

For Rel.17 NR FeMIMO, on MPE mitigation (that is, minimizing the UL coverage loss due to the UE having to meet the MPE regulation), if needed, candidate solutions to be down-selected can be identified. The following sub-categories can be used: CAT0 with the need for specification support for MPE event detection and, if needed, candidate solutions; CAT1 with the need for UE reporting associated with an MPE and/or a potential/anticipated MPE event if the UE selects a certain UL spatial resource, e.g., corresponding to DL or UL RS; CAT2 with the need for NW signalling in response to the reported MPE event (taking into account issue 1) and UE behavior after receiving the NW signalling. P-MPR reporting can be specified (for TS 38.101/102/133) which can be used as a baseline scheme for further enhancement.

For Rel.17 NR FeMIMO, feature(s) can be specified for beam acquisition (including beam tracking and refinement) latency reduction, such as for scenarios with high-speed UEs and large number of configured TCI states. Partial BFR can be handled with beam management enhancement for mTRP.

Based on the issues with current beam-management procedures, enhancements based on AI algorithms have been suggested that could involve additional assisted information for faster/accurate learning. However, no specific solutions or details have been discussed, but just the application of AI was considered.

A deep neural network-based beam selection method is suggested that leverages position and orientation of the receiver to recommend a shortlist of the best beam pairs, thus significantly reducing the alignment overhead. However, the concept is proposed in more generic terms and it is not discussed/proposed on how to enable such position/orientation-based beam-management in 3GPP NR framework.

Embodiments can enable/facilitate predictive beamforming in NR, thereby enabling gNB(s) to configure and/or indicate a UE of when and how to change its Tx and/or Rx beam for future transmissions and reception. Configuration of predictive beamforming can depend on the UE's current position relative to either one or more TRPs and/or relative to other nodes in the system, such as other UEs the UE's mobility, can depend on the UE's orientation, and can depend on the UE's predicted/expected movement based on the speed/direction. Embodiments can also provide mechanisms in which the location and tracking information can be provided in coordination with the predictive beamforming configuration.

At least some embodiments can reduce the need to dynamically update the beams for transmissions/receptions, especially when the beam dwelling time is expected to be quite short and the required latency for new beam configuration/update/indication is longer than the beam dwelling time. Furthermore, the seamless switching of TRPs can reduce the time needed to configure the TRPs arising from different gNBs, e.g., in an IIoT scenario with multiple gNBs located in a limited geographic area.

The amount of time the UE can use the same beam to receive DL transmissions is referred to as Rx beam dwelling time for a UE and similar methods can be applied to other directions/links of communication, such as SL communication.

For periodic beam switching, according to a possible embodiment, a UE is configured/indicated by a network (gNB) with N Rx beams to receive DL transmissions and/or M Tx beams to transmit UL transmissions with periodicity of $P_{rx}$ and $P_{tx}$, respectively, when a UE follows a fixed path corresponding to a TRP and repeats upon the fixed path in a periodic manner. Basically, a beam periodicity corresponds to the switching of the same beam after every period that is configured/indicated by gNB. Alternatively, instead of configuring the periodicity of beams, the duration for each of the beams can be configured/indicated to the UE. Furthermore, the sequence or the order of applying the configured/indicated beams for each of the reception and transmission set is either explicitly indicated to the UE or can be implicitly determined by the UE.

FIGS. 6A-I are example illustrations of a system 600 showing periodic beam switching for circular path UE or rotating UE according to a possible embodiment. The illustrations show DL reception at the UE that is moving in a circular path around a TRP, where the UE is configured with (N=8 Rx beams), including beam 1, beam 2, beam 3, beam 4, beam 5, beam 6, beam 7 and beam 8 and a single periodicity value is configured for all the beams that is equal to the duration for a UE to complete a cyclical motion. The cyclical motion can be circular, rectangular, linear, a combination thereof, and/or any other cyclical motion. The duration for each of the beams can be calculated based on the periodicity of beams and number of beams that are configured/indicated, assuming each beam has same duration (beam dwelling time). In this example, the dwelling time TIN depends on the speed of the UE, the beam width, as well as the radius of the circle (the distance to the TRP). An indication may be signalled to the UE, in the case that different beams/different group/set of beams have different dwelling times.

Figure 7:
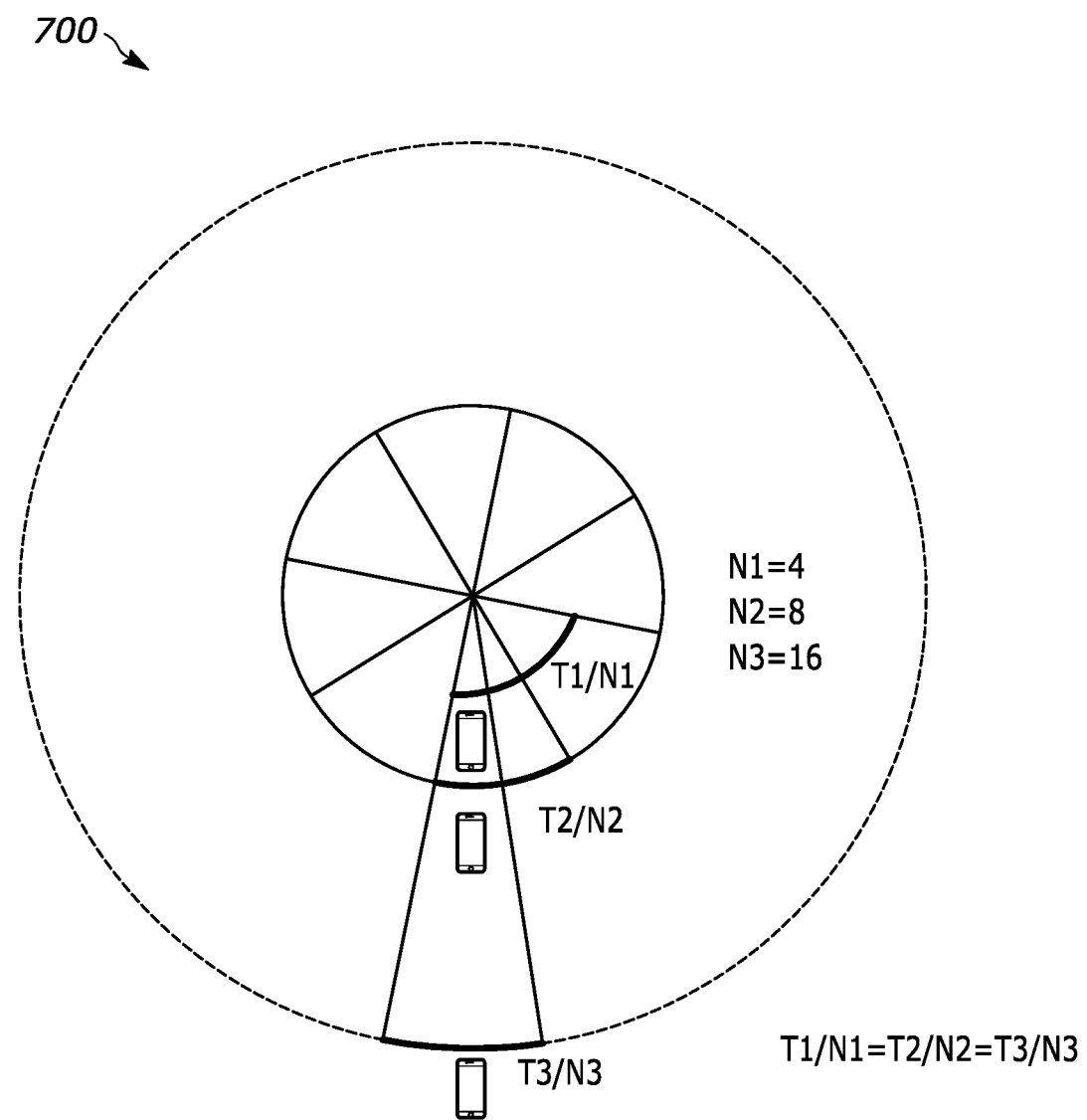
FIG. 7 is an example illustration of periodic beam switching for UEs in circular paths with the same dwelling time according to a possible embodiment.

FIG. 7 is an example illustration 700 of periodic beam switching for UEs in circular paths with the same dwelling time according to a possible embodiment. The gNB may change the number of beams and/or the width of each beam upon the distance/speed of the UE such that the UE enjoys the beams with the same dwelling time. This can avoid frequent beam switching and/or reporting when the UE is moving close to the TRP and to achieve similar/stable link budget performance.

In one embodiment, a UE is configured/indicated by network (gNB) with N Rx beams to receive DL transmissions and/or M Tx beams to transmit UL transmissions with periodicity of $P_{rx}$ and $P_{tx}$, respectively, when UE is not moving, but instead rotating upon its axis such that the Tx-RX beam pair changed for every M degrees of rotation.

For determination of beam, beam periodicity and beam duration based on periodic RS/SSB, in some embodiments the gNB determines the best beams/candidate set of beams based on a periodic RS (such as CSI-RS and/or SSB) measurements reported by the UE and additionally also determines the periodicity corresponding to each of those best beams i.e., the duration of the time span that the UE is able to receive the same beam above pre-configured threshold. The UE not only reports the beam measurements such as L1-RSRP/RSRQ/RSSI but is also additionally configured to report the instances/periods for which the beam was successfully received. Duration of beam can be explicitly indicated in terms of time units such as number of symbols or number of slots or absolute time duration (e.g., ms). Another alternative is that the UE determines the duration of each beam by dividing the indicated periodicity by number of indicated beams, when the same periodicity is reported for each beam.

Figure 8:
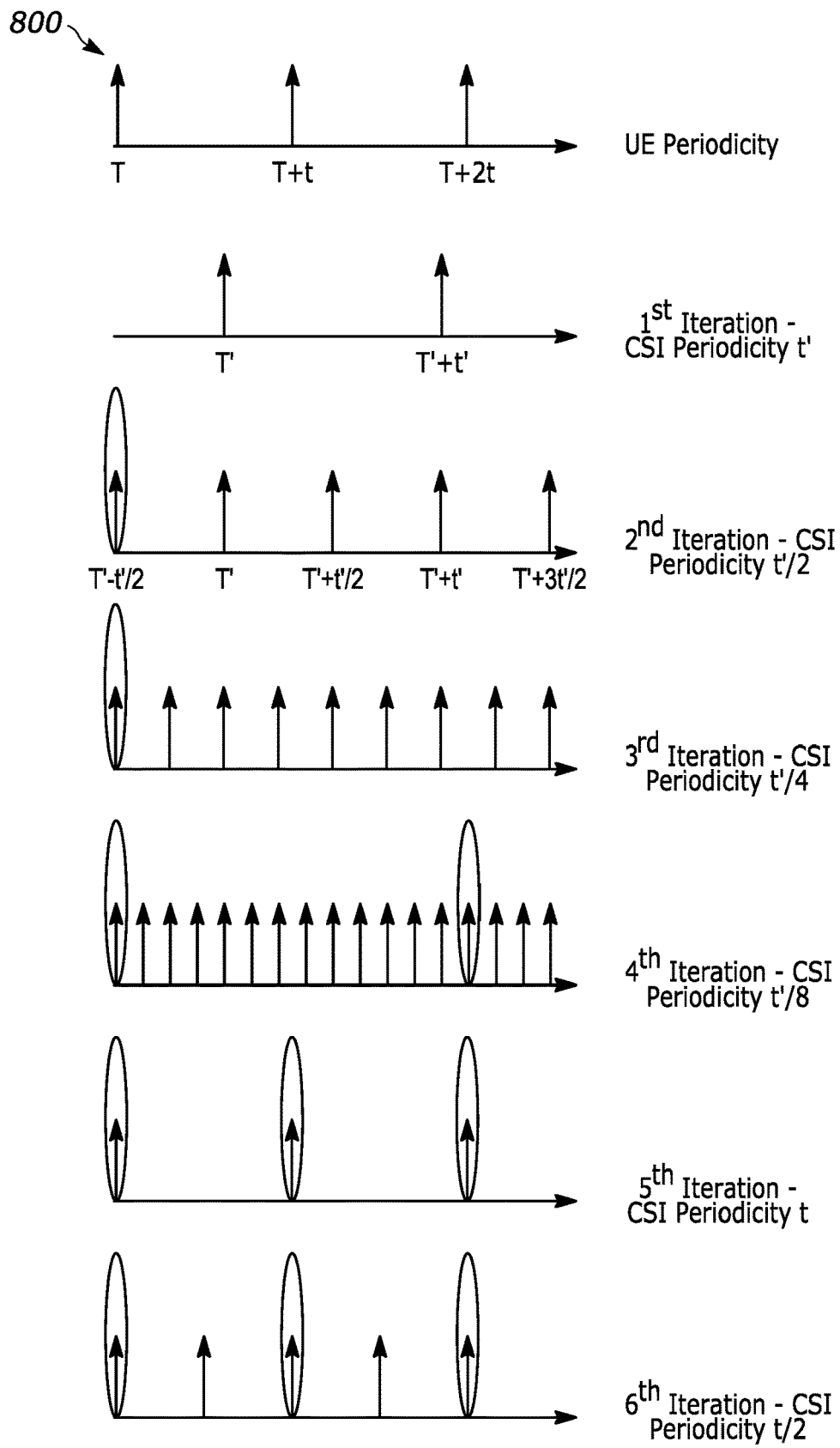
FIG. 8 is an example illustration of CSI-RS periodicity iterations to determine UE periodicity to receive/transmit on a corresponding beam according to a possible embodiment.

FIG. 8 is an example illustration 800 of CSI-RS periodicity iterations to determine UE periodicity to receive/transmit on a corresponding beam according to a possible embodiment. In this example, a gNB can iteratively determine the UE periodicity, where several iterations are done by the gNB to determine the UE periodicity corresponding to each of the best determined beams. In the illustration 800, the UE periodicity is t units of time which may not be known at the UE at the beginning of CSI-RS transmission. In iteration 1, the gNB transmits a periodic CSI-RS transmission in a specific beam with periodicity t' units that is not matched with the UE periodicity. Based on example iteration 1, the UE does not report the corresponding beam among the best beam set. Then, in iteration 2, the gNB reduces the periodicity to t'/2 and in this case the UE reports the corresponding beam among the best beams and also indicates that UE was able to successfully receive on this beam on the first instance within the last 5 CSI periods. Then, in iteration 3, the gNB further reduces the periodicity to t'/4 and in this case the UE reports the corresponding beam among the best beams and also indicates that the UE was able to successfully receive on this beam on the first instance within the last 9 CSI periods. Similarly, in iteration 4, the UE reports that beam was successfully received on first and fourteenth instance within the last 17 CSI periods. In iteration 5, once the gNB has two instances reported, then the gNB updates the periodicity to match to half of the periodicity the received instances in the last iteration. Then, in iteration 6 and onward, gNB continues to reduce the periodicity until the CSI periodicity is matched with UE periodicity.

This information related to determining the UE periodicity can be applied to the periodicities of other CSI-RS transmissions/reporting in other beam directions to eliminate or reduce the need for iterations. The illustration 800 is just one example to determine UE periodicity based on CSI-RS transmissions periodicity and corresponding measurements. Other possibilities depending upon position measurements, mobility measurements, and other possibilities can also be utilized for determining UE periodicity. For example, based on the location and the reported direction/speed/rotation of the UE, the gNB updates the CSI-RS periodicity to match the UE periodicity. If the UE is moving with a fixed speed, then upon the expected dwelling time for each beam, the gNB determines a fixed CSI-RS periodicity for each beam in a number of future slots. If the UE is moving with acceleration, the gNB upon the last few instances of the reported speed determines/updates the CSI-RS periodicity with an increasing periodicity pattern for a number of next slots, and with a decreasing periodicity pattern in case of deacceleration.

For signalling for periodic beam switching, in some embodiments, the UE is semi-statically configured by the gNB via RRC signalling a set of beams, duration of each beam, sequence of beam to be applied in a periodic manner, and the slot offset (starting time) for at least the first instance of the first beam to be applied. In one implementation, at least two sets of beams are configured to the UE, where one set corresponds to the Rx beam/spatial filter at the UE to receive downlink transmissions and the other set corresponds to the Tx beam/spatial filter at the UE to transmit uplink transmissions. In an alternate implementation, only a single set of beams are configured to the UE that is applied to both the uplink transmission from UE and downlink reception at the UE, when beam correspondence is supported at the UE.

In some embodiments, the configured beam set, beam periodicity and/or beam duration is activated by a DCI field. For example, a single bit field is used to indicate the activation of newly configured beam set and corresponding information, where a '0' value can imply that a new set is not activated and a '1' value implies that a new set is activated and should be applied by the UE.

In some embodiments, the UE is not specifically configured and/or indicated with duration or periodicity of beams, but is indicated a sequence of beams that should be applied at the UE. In this case, UE measures the PDCCH DM-RS and/or PDSCH DM-RS and when the measured DM-RS RSRP falls below a certain threshold, then the UE can autonomously switch to the next beam in the indicated beam sequence. In this embodiment, gNB is not expected to be informed about the beam switching at the UE and is expected to receive transmissions on any of the beams in sequence.

In another implementation, the UE autonomously switches to the next beam in the indicated beam sequence based on the decoding error of the data/control channel or HARQ-NACK feedback or DTX. In another implementation, the UE autonomously switches to the next beam in the indicated beam sequence based on its movement behavior (speed/heading).

In some embodiments, the beam is indicated by a TCI state with QCL type-D assumption, where a source RS is indicated such that the UE is expected to use the same Rx/Tx spatial filter that was used to receive/transmit the source RS.

A related embodiment can provide for predictive beam switching for multi-TTI scheduling. A UE scheduled with multiple transmissions/repetitions for PDSCH or PUSCH using a single DCI is indicated/configured with multiple corresponding beams and can be additionally indicated with a sequence of beams and the duration for each beam to be applied by the UE.

In one implementation, TCI field in the DCI is enhanced to indicate multiple TCI states (with QCL type-D assumption) and the corresponding duration for receiving each of the DL beams at the UE, as illustrated in Table 1. For example, if TCI index 1 is indicated in the DCI field, then the UE applies TCI state 3 on a first slot for DL transmissions, followed by TCI state 1 on the second slot for DL transmissions.

TABLE 1

Example of TCI table with duration for TCI states (beam duration)

| TCI Index | First TCI State/ Number of slots. | Second TCI state/ Number of slots |
|---|---|---|
| 0 | TCI state 1, 2 slots | TCI state 2, 3 slots |
| 1 | TCI state 3, 1 slot | TCI state 1, 1 slot |

In another implementation of this embodiment, only a single value is indicated/configured for the duration for which each of the indicated/configured TCI states are applied. This duration could be either included as part of the TCI table or some other field in the DCI or semi-statically configured by RRC.

In another implementation, a DCI field contains two TCI states representing the 'present TCI state' to be applied in the first set of repetitions/transmissions and 'next TCI state' to be applied in the second set of repetitions/transmissions. The UE is configured either semi-statically or dynamically about the first set of repetitions/transmissions and the second set of repetitions/transmissions. The UE autonomously switches to the 'next TCI state' to receive the second set of repetitions/transmissions.

In an alternate embodiment, a UE scheduled with multiple transmissions/repetitions for PDSCH or PUSCH using a single DCI is indicated/configured with multiple corresponding beams and can be additionally indicated with sequence of beams to be applied by the UE. The UE applies the first TCI state for receiving the first PDSCH following the PDCCH and continues to use the same beam until it receives a MAC CE in one of the PDSCH that can be a single bit indication for switching the TCI state to the next TCI state in the indicated index of DCI field. Basically, DCI is used for indicating multiple TCI states, but MAC CE is used to indicate the switching from one TCI state table to another TCI state table.

In an alternate embodiment, a UE scheduled with multiple transmissions/repetitions for PDSCH or PUSCH using a single DCI is indicated/configured with multiple corresponding beams and can be additionally indicated with sequence of beams to be applied by the UE, and the UE is expected to autonomously switch to next beam in the sequence when the PDCCH/PDSCH DM-RS or some other RS based on beam measurements is below a certain pre-configured threshold.

In some embodiments, a UE receives a single DCI that schedules both PDSCH and PUSCH across multiple transmission time intervals spanning one or multiple slots and receives corresponding beam indication via TCI states with QCL type-D assumption in the DCI. In one implementation, a unified TCI state field is used, where the index of the field indicates multiple TCI states and a corresponding duration for each of the TCI states. The TCI states are applied accordingly for the indicated duration and switching from one TCI state to another in a sequential manner. The UE is expected to use same Rx/Tx filter based on the common/unified TCI state. For example, if TCI index 0 is indicated from Table 2, then for the two slots following the PDCCH reception, UE will use TCI state 1 for both UL transmissions and DL receptions that might be scheduled in those two slots. Then after two slots, TCI state 2 is applied for both UL and DL in the following three slots. In an alternate embodiment, two sets of TCI states are indicated either using a same TCI field or a separate TCI field, where one set is applicable for receiving DL at the UE and transmitting UL from the UE. In another embodiment, the duration for which each of the TCI state is applicable for either of DL or UL or both is not indicated by DCI but switching of TCI states is triggered by MAC CE. Basically, a MAC CE can indicate that the following UL and/or DL should use the next TCI state unless it receives another MAC CE trigger.

A related embodiment can provide for location configurations for predictive beamforming. Location-related information can be reported to the gNB by the UE or a location server, such as an LMF, for the purposes of predictive beamforming and can also be used in conjunction with the above embodiments. A UE may report the predetermined route (otherwise estimated or calculated trajectory containing future location coordinates) in the form of waypoints with a fixed distance between each waypoint. Each waypoint can correspond to a particular Tx beam (and associated configuration) from same or different gNBs. This predetermined waypoint report may be shared with the serving gNB and subsequently shared with multiple neighboring gNBs (e.g., via the Xn interface between the gNBs).

The waypoint configuration can be reported semi-statically by the UE or LMF to the gNB and can include the length of waypoints, the 2D/3D location of each waypoint, the expected time at each waypoint, the expected orientation at each waypoint, the UE heading, and other waypoint information. In another implementation, the waypoint configuration can include a set of waypoints with a smaller distance between each waypoint (finer granularity) and another set of waypoints with a larger/greater distance between each waypoint (course granularity). Such a waypoint can be signaled via RRC from the UE to the gNB, e.g., using LocationMeasurementInfo or LocationInfo or any other UE assistance signalling. Alternatively, the waypoint configuration may be provided by the LMF via the NRPPa interface to the serving gNB and neighboring gNBs along the planned/predetermined route of the UE. The AoD spatial direction information (e.g., beam azimuth and elevation) of each Tx beam may be mapped to each of the waypoints at the gNB.

In one implementation, a narrower beam may be configured for a specific waypoint, while another waypoint in the same configuration may utilize a wider beam. Another application can involve the mapping between the TCI table indication in Table 1 and the duration that the UE spends at each waypoint.

In an alternative implementation, the waypoints can be dynamically reported to the gNB, such as in the case that a semi-static configuration cannot be provided to the gNB upon the start of the UE's predetermined route/upon triggering predictive beamforming or if there is an unplanned route/path change.

In another implementation, a particular waypoint may have a candidate set of available Tx beams from the same/different gNB. The UE may select the best beam from this candidate set based on pre-defined criteria such UE's orientation and/or speed at that waypoint, L1-RSRP/RSRQ/RSSI measurements of configured RS-signals, or other criteria.

A related embodiment can provide for common beam configuration/indication for multiple UEs. Common beam(s) can be configured to multiple UEs within a certain area/zone. The beam configuration can contain the following: common beam ID for a location coordinate or range of coordinates or relative position with respect to one or multiple TRPs; common beam ID associated to each zone, where each zone is created based on a defined geo-location such as latitude or longitude or based on RSRP; beam defined based on AoA at the UE for DL reception or AoD at the UE for UL transmission; relative orientation relative to one or multiple TRPs; and/or a UE moving from one zone to another zone can autonomously reconfigure the common beam id according to the zone configuration, where a gNB can signal the beam configuration corresponding to each zone via RRC common signalling.

In some embodiments, multiple set of UEs are configured, where each set corresponds to UEs with same capability in terms of beam width that can be generated for different frequency ranges. Basically, when a UE connects to network, it reports its category related to beam width capability depending up on frequency range, as illustrated in Table 2.

TABLE 2

Example of UE beam width capability

|  | Frequency range | Beam width range |
|---|---|---|
| UE capability 1 | FR1 | 80-90 degrees |
|  | FR2 up to 52.6 GHz | 60-80 degrees |
|  | FR2 beyond 52.6 GHz up to 71 GHz | 40-60 degrees |
|  | Beyond 71 GHz up to 114.25 GHz | 20-40 degrees |
| UE capability 2 | FR1 | 50-90 degrees |
|  | FR2 up to 52.6 GHz | 30-80 degrees |
|  | FR2 beyond 52.6 GHz up to 71 GHz | 15-60 degrees |
|  | Beyond 71 GHz up to 114.25 GHz | 1-40 degrees |

In some of the embodiments, a common periodic RS resource/resource set such as common periodic CSJ-RS resource/resource set is configured to multiple UEs within the same set that support same UE beam width capability, but different corresponding CSJ report resources are configured. In one implementation of this embodiment, the UE performs measurements on common periodic RS and reports back measurements on dedicated CSI resources for each of the UE and additionally indicates the beam width range.

Figure 9:
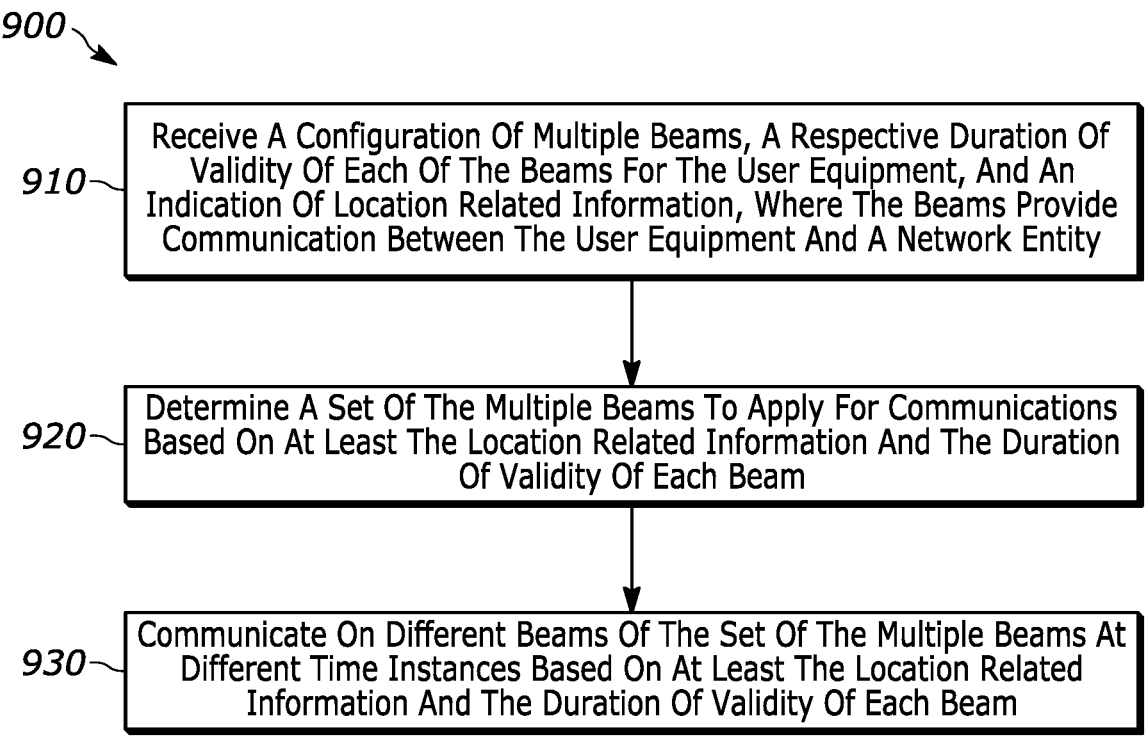
FIG. 9 is an example flowchart illustrating the operation of a wireless communication device according to a possible embodiment.

FIG. 9 is an example flowchart 900 illustrating the operation of a wireless communication device, such as the UE 110, according to a possible embodiment. At 910, a configuration of multiple beams, a respective duration of validity of each of the beams for the UE 110, and an indication of location related information can be received. The beams can provide communication between the UE 110 and a network entity. At 920, a set of the multiple beams to apply for communications can be determined based on at least the location related information and the duration of validity of each beam. At 930, different beams of the set of the multiple beams can be communicated on at different time instances based on at least the location related information and the duration of validity of each beam. The flowchart 900 can also incorporate operations from the other embodiments.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 10:
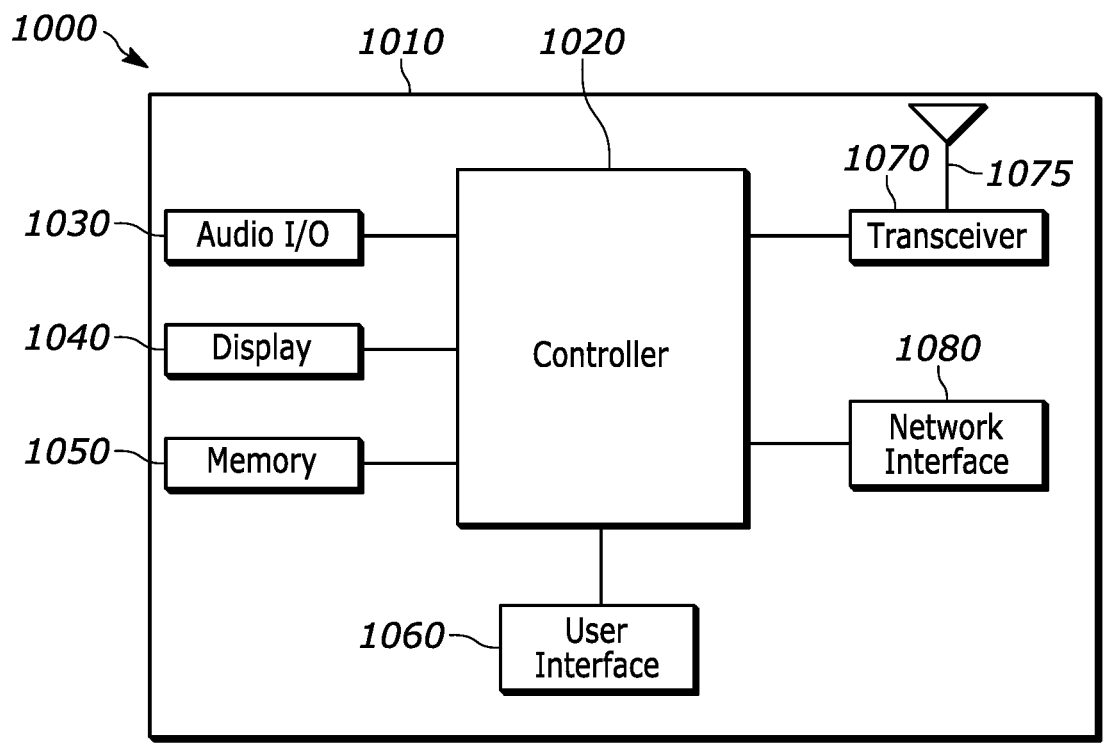
FIG. 10 is an example block diagram of an apparatus according to a possible embodiment.

FIG. 10 is an example block diagram of an apparatus 1000, such as the UE 110, the network entity 120, or any other wireless communication device disclosed herein, according to a possible embodiment. The apparatus 1000 can include a housing 1010, a controller 1020 coupled to the housing 1010, audio input and output circuitry 1030 coupled to the controller 1020, a display 1040 coupled to the controller 1020, a memory 1050 coupled to the controller 1020, a user interface 1060 coupled to the controller 1020, a transceiver 1070 coupled to the controller 1020, at least one antenna port 1075, such as at least one antenna, coupled to the transceiver 1070, and a network interface 1080 coupled to the controller 1020. The apparatus 1000 may not necessarily include all of the illustrated elements for different embodiments of the present disclosure. The apparatus 1000 can perform the methods described in all the embodiments.

The display 1040 can be a viewfinder, an LCD, an LED display, an OLED display, a plasma display, a projection display, a touch screen, or any other device that displays information. The transceiver 1070 can be one or more transceivers that can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a USB port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1050 can include a RAM, a ROM, an EPROM, an optical memory, a solid-state memory, a flash memory, a removable memory, a hard drive, a cache, or any other memory that can be coupled to an apparatus.

The apparatus 1000 or the controller 1020 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1050, elsewhere on the apparatus 1000, in cloud storage, and/or anywhere else that can store software and/or an operating system. For example, coding for operations can be implemented as firmware programmed into ROM. The apparatus 1000 or the controller 1020 may also use hardware to implement disclosed operations. For example, the controller 1020 may be any programmable processor. Furthermore, the controller 1020 may perform some or all of the disclosed operations. For example, at least some operations can be performed using cloud computing and the controller 1020 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

In operation, the apparatus 1000 can perform the methods and operations of the disclosed embodiments. The transceiver 1070 can transmit and receive signals, including data signals and control signals that can include respective data and control information. The controller 1020 can generate and process the transmitted and received signals and information.

According to a possible embodiment, the transceiver 1070 can receive a configuration of multiple beams, a respective duration of validity of each of the beams for the apparatus 1000, and an indication of location related information. The beam validity can be how long a beam is useful for a UE. The beams provide communication between the apparatus 1000 and a network entity. The beams can be downlink reception beams for the UE from a network entity, uplink transmission beams from the UE to the network entity, or a combination thereof. Operations can be performed by a UE, by a gNB, by a network entity, or by any combination thereof.

The controller 1020 can determine a set of the multiple beams to apply for communications based on at least the location related information and the duration of validity of each beam. The transceiver 1070 can communicate on different beams of the set of the beams at respective different time instances based on at least the location related information and the duration of validity of each beam. The communication can be transmitting and/or receiving wireless signals. The time instances can be periodic, such as a time instances that repeat themselves. According to a possible embodiment, a set of the multiple beams can be determined to apply communications during a given time period based on at least the location related information and the duration of each beam and different beams can be communicated on for different portions of the time period.

According to a possible embodiment, the location related information can be implicitly indicated to the apparatus 1000 in terms of starting time instance when a beam is to be applied for first time, the duration of validity of the beam, and a beam periodicity. The beam periodicity can correspond to the periodicity for the apparatus 1000 to complete a cycle of movement. The beam periodicity can be the duration after the beam starting time until the same beam is repeated. The cycle of movement can be the apparatus 1000 completely turning around, apparatus movement through a closed path, apparatus movement around a fixed circular path, or any other cycle of movement. According to a possible embodiment, the periodicity can refer to a cyclical change of orientation of the apparatus 1000 while in a fixed position. A fixed position may allow slight movement in position location, but primary movement in orientation.

According to a possible embodiment, the controller 1020 can determine the apparatus 1000 is scheduled via a single DCI for multiple physical shared channel communications across multiple transmission time intervals and also indicated multiple beams via multiple TCI states. The controller 1020 can determine, in response to determining the apparatus 1000 is scheduled and indicated, an index of a TCI field that indicates the transmission time intervals for which each of the indicated TCI states are valid. For example, if the apparatus 1000 is scheduled via a single DCI for multiple shared channel communications across multiple transmission time intervals and also indicated multiple beams via multiple TCI states, then the index of the TCI field also indicates the transmission time intervals for which each of the indicated TCI states are valid. A shared channel can be a PDSCH, a PUSCH, and/or any other shared channel. The shared channel communications can be transmissions, such as on a PUSCH, and/or receptions, such as on a PDSCH.

According to a possible embodiment, the controller 1020 can determine the apparatus 1000 is scheduled via a single DCI for multiple physical shared channel communications across multiple transmission time intervals and also multiple beams via multiple TCI states are indicated to the apparatus by at least one DCI codepoint. The controller 1020 can determine, in response to determining the apparatus 1000 is scheduled and indicated, a MAC CE indication is used to trigger a switch from one TCI state to another TCI state from the indicated TCI states that are indicated by at least one DCI codepoint. For example, if the apparatus 1000 is scheduled via single DCI for multiple PDSCH or PUSCH receptions across multiple transmission time intervals and also indicated multiple beams via multiple TCI states, a MAC CE indication is used to trigger the switch from one TCI state to another TCI state from a set of TCI states that are indicated by the DCI codepoint(s).

According to a possible embodiment, the controller 1020 can determine the apparatus 1000 is scheduled via single DCI for multiple physical shared channel communications across multiple transmission time intervals and also indicated multiple beams via multiple TCI states. The controller 1020 can determine, in response to determining the apparatus 1000 is scheduled and indicated, a first TCI state is applied for the first transmission time interval and following transmission time intervals unless a received signal strength for a RS with the same first TCI state reduces below a pre-configured threshold value. For example, if the apparatus 1000 is scheduled via single DCI for multiple PDSCH or PUSCH receptions across multiple transmission time intervals and also indicated multiple beams via multiple TCI states, then the first TCI state is applied for the first transmission time interval and following transmission time intervals, unless the received signal strength for the PDCCH/PUSCH/PUCCH DM-RS or any other RS being transmitted with same TCI state reduces below a pre-configured threshold value.

According to a possible embodiment, the controller 1020 can determine the apparatus 1000 is scheduled via single DCI for multiple physical shared channel communications across multiple transmission time intervals. The controller 1020 can determine, in response to determining the apparatus 1000 is scheduled, at least one DCI codepoint indicates two sets of TCI states, where each set of TCI states indicates a respective set of beams. The at least one DCI codepoint can be a single DCI codepoint or multiple DCI codepoints. For example, if the apparatus 1000 is scheduled via single DCI for multiple transmissions/repetitions of both multiple PDSCH or PUSCH receptions across multiple transmission time intervals, then two set of beams via two set of TCI states are indicated to the UE by either a single DCI codepoint or multiple DCI codepoints.

According to a possible embodiment, the controller 1020 can determine the apparatus 1000 is scheduled via single DCI for multiple physical shared channel communications across multiple transmission time intervals. The controller 1020 can determine, in response to determining the apparatus 1000 is scheduled, at least one DCI codepoint indicates one set of TCI states, where the set of TCI states indicates only one set of beams. For example, if apparatus 1000 is scheduled via single DCI for multiple transmissions/repetitions of both multiple PDSCH or PUSCH receptions across multiple transmission time intervals, then only one set of beams via one set of TCI states is indicated to the UE by the single codepoint. According to a possible implementation, TCI states within the one set of TCI states are shared between DL reception and UL transmission.

According to a possible implementation, the controller 1020 can determine the apparatus 1000 is capable of beam correspondence. The controller 1020 can determine, in response to determining the apparatus 1000 is capable of beam correspondence, a same TCI state is applied for both receiving DL signals and transmitting UL signals. According to a possible implementation, a periodicity or duration for each of the indicated TCI states for each of the sets is also indicated by a same codepoint as the codepoint used for TCI state indication for both receiving DL signals and transmitting UL signals. According to a possible implementation, a MAC CE indication can be used to trigger a switch from one TCI state to another TCI state from the set of TCI states that are indicated by the DCI codepoint for both receiving DL signals and transmitting UL signals. According to a possible implementation, the controller 1020 can determine a received signal strength of a DM-RS for physical channel communications is below at least one preconfigured threshold value. The controller 1020 can trigger, in response to determining the received signal strength is below the at least one preconfigured threshold value, a switch from one TCI state to another TCI state from the set of TCI states that are indicated by the DCI codepoint. For example, a received signal strength of the DM-RS for PDSCH/PUSCH/PUCCH is used to trigger the switch from one TCI state to another TCI state from the set of TCI states that are indicated by the DCI codepoint(s), when the strength is below pre-configured threshold value(s).

According to a possible embodiment, the transceiver 1070 can receive, via RRC signalling, a configuration with a common beam or beam-set information that contains at least the location related information, expected AoA for DL reception, and expected AoD for UL transmission. For example, the apparatus 1000 can be configured with a common beam/beam-set information via RRC signalling that contains at least the location related information, expected AoA for DL reception and expected AoD.

In operation according to another possible embodiment as a network entity, the controller 1020 can determine a configuration of multiple beams, a respective duration of validity of each of the beams for a UE, and an indication of location related information. The transceiver 1070 can transmit the configuration of multiple beams, the respective duration of validity of each of the beams for the UE, and the indication of location related information. The transceiver 1070 can communicate on different beams of a set of the multiple beams at different time instances based on at least the location related information and the duration of validity of each beam. Operation as the network entity can include operations from the other embodiments.

At least some embodiments can provide predictive beamforming for UEs that follow a periodic circular motion, such as on fixed path, a periodic location change, and/or a periodic orientation change along with required signalling and new procedures including: the network indicating multiple beams and at least periodicity of each beam to be applied such that the UE is aware in advance about which beam is applied at what time and for how long, such as before switching or other beam. At least some embodiments can provide predictive beamforming for UEs that are scheduled with multiple PDSCH/PUSCH by a single DCI where multiple beams are indicated, and different alternatives can allow UE to determine which beam to use when and for how long. At least some embodiments can provide a new framework for configuring/indicating common beams across multiple UEs. At least some embodiments can provide positioning related enhancements relevant to beam-management.

According to a possible embodiment, a method at a device such as a gNB or User Equipment (UE), can include receiving a configuration of multiple beams, respective duration of each of the beams and location related information. The method can include a procedure for the UE to determine which of the indicated beams need to be applied for transmission/reception for a given time instance based on at least the location related information and duration of each beam.

According to a possible embodiment, the location related information can be implicitly indicated to the UE in terms of starting time instance when a beam is to be applied for first time and the beam periodicity, i.e., the duration after which the same beam is repeated, where the beam periodicity corresponds to the periodicity for a UE to completely on round or movement around a fixed circular path. The periodicity can also refer to the rate of change of orientation of a UE, while being a fixed position.

According to a possible embodiment, if the UE is scheduled via single DCI for multiple PDSCH or PUSCH receptions across multiple transmission time intervals and also indicated multiple beams via multiple TCI states, then the index of the TCI field can also indicate the transmission time intervals for which each of the indicated TCI states are valid.

According to a possible embodiment, if the UE is scheduled via single DCI for multiple PDSCH or PUSCH receptions across multiple transmission time intervals and also indicated multiple beams via multiple TCI states, MAC CE indication can be used to trigger the switch from one TCI state to another TCI state from the set of TCI states that are indicated by the DCI codepoint(s).

According to a possible embodiment, if the UE is scheduled via single DCI for multiple PDSCH or PUSCH receptions across multiple transmission time intervals and also indicated multiple beams via multiple TCI states, then the first TCI state is applied for the first transmission time interval and following transmission time intervals, unless the received signal strength for the PDCCH/PUSCH/PUCCH DM-RS or any other RS being transmitted with same TCI state reduces below a pre-configured threshold value.

According to a possible embodiment, if the UE is scheduled via single DCI for multiple transmissions/repetitions of both multiple PDSCH or PUSCH receptions across multiple transmission time intervals, then two set of beams via two set of TCI states are indicated to the UE by either a single DCI codepoint or multiple DCI codepoints.

According to a possible embodiment, if UE is scheduled via single DCI for multiple transmissions/repetitions of both multiple PDSCH or PUSCH receptions across multiple transmission time intervals, then only one set of beams via one set of TCI states is indicated to the UE by the single codepoint.

According to a possible embodiment, TCI states within the single set of TCIs can be shared between DL reception and UL transmission.

According to a possible embodiment, the same TCI can be applied to receive DL and transmit UL, when the UE is capable of beam correspondence. Periodicity or duration for each of the indicated TCI states for each of the sets is also indicated by the same codepoint as for TCI state indication for both DL and UL. MAC CE indication can be used to trigger the switch from one TCI state to another TCI state from the set of TCI states that are indicated by the DCI codepoint(s) for both DL and UL. Received signal strength of the DM-RS for PDSCH/PUSCH/PUCCH can be used to trigger the switch from one TCI state to another TCI state from the set of TCI states that are indicated by the DCI codepoint(s), when the strength is below pre-configured threshold value(s).

According to a possible embodiment, a UE can be configured with a common beam/beam-set information via RRC signalling that contains at least the location related information, expected AoA for DL reception and/or expected AoD for UL transmission.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

List of Abbreviations

3GPP Third Generation Partnership Project
ACK Acknowledgement
A-CSI Aperiodic CSI
AL Aggregation Level
AoA Angle of Arrival
AoD Angle of Departure
BF Beam Formed
BS Base Station
BWP Bandwidth Part
CBG Code Block Group
CC Component Carrier
CCA Clear Channel Assessment
CCCH SDU Common Control Channel Service Data Unit
CCE Control Channel Element
CG Configured Grant
CI Cancellation Indication
COT Channel Occupancy Time
CSI-RS Channel State Information Reference Signal
CRC Cyclic Redundancy Check
CRI CSI-RS Resource Index
C-RNTI Cell RNTI
CSI Channel State Information
CSI-RS Channel State Information Reference Signal
CSS Common Search Space
CWS Contention Window Size
DCI Downlink Control Information
DL Downlink
DM-RS DeModulation Reference Signal
DTX Discontinuous Transmission
EIRP Effective Isotropic Radiated Power
FeMIMO Further enhanced MIMO
FR Frequency Range
GC-DCI Group Common DCI
HARQ-ACK Hybrid Automatic Repeat Request-Acknowledgement
HO Handover
IIoT Industrial Internet of Things
L1 Level 1
LBT Listen Before Talk
LMF Location Management Function
MAC CE Medium Access Control Control Element
MCG Master Cell Group
MCS Modulation and Coding Scheme
MIMO Multiple Input Multiple Output
MPE Maximum Permissible Exposure
mTRP multi-TRP
NACK Non-Acknowledgement
NR New Radio
NR-U NR Unlicensed
NRPPa NR Positioning Protocol A
PCell Primary Cell
PDSCH Physical Downlink Shared Channel
PI Pre-emption Indication PRS Positioning Reference Signal
PT-RS Phase Tracking Reference Signal
PUCCH Physical Uplink Control Channel
PUSCH Physical Uplink Shared Channel
FDD Frequency Division Duplex
QCL Quasi Co-Location
RA Random Access
Rel. Release
RNTI Radio Network Temporary Identifier
RRC Radio Resource Control
RRM Radio Resource Management
RS Reference Signal
RSRP Reference Signal Received Power
RSRQ Reference Signal Received Quality
RSSI Received Signal Strength Indicator
RSTD Reference Signal Time difference
Rx Receive
SCG Secondary Cell Group
SCS Sub Carrier Spacing
SFI Slot Format Indicator
SL Sidelink
SLIV Start and Length Indicator Value
SS/PBCH Synchronization Signal/Physical Broadcast Channel
SSB Synchronization Signal Block
SSBRI SS/PBCH Block Resource Index
SR Scheduling Request
SP-CSI Semi-persistent CSI
SPS Semi-persistent scheduling
SRS Sounding Reference Signal
SRI SRS Resource Indicator
TB Transport Block
TCI Transmission Configuration Indicator
TDD Time Division Duplex
TDRA Time Domain Resource Allocation
TMPI Transmit Precoding Matrix Index
TPC Transmit Power Control
TRP Transmission Reception Point
TS Technical Specification
Tx Transmit
UCI Uplink Control Information
UE User Equipment
UL Uplink
URLLC Ultra-Reliable Low-Latency Communication
USS User-specific Search Space

We claim:

1. A user equipment (UE) for wireless communication, comprising:
at least one memory; and
at least one processor coupled with the at least one memory and configured to cause the UE to:
receive a configuration of multiple beams indicating a set of transmission configuration indicator (TCI) states and an indication of location related information, wherein the location related information indicates a first slot in which to apply a TCI state of the set of TCI states, and wherein the multiple beams provide communication between the UE and a network entity;
determine a set of the multiple beams to apply for communications based on at least the set of TCI states and the location related information; and
communicate on different beams of the set of multiple beams at different respective time instances, wherein the respective time instances are based on at least the location related information and the set of TCI states.

2. The UE of claim 1, wherein the location related information is implicitly indicated to the UE in terms of a starting time instance when a beam is to be applied for first time, a duration of validity of the beam, and a beam periodicity, wherein the beam periodicity corresponds to a periodicity for the UE to complete a cycle of movement.

3. The UE of claim 1, wherein the at least one processor is configured to cause the UE to:
determine the UE is scheduled via a single downlink control information for multiple physical shared channel communications across multiple transmission time intervals and also indicated the multiple beams via the set of TCI states; and
determine, in response to determining the UE is scheduled and indicated, an index of a TCI field that indicates the transmission time intervals for which each of the TCI states are valid.

4. The UE of claim 1, wherein the at least one processor is configured to cause the UE to:
determine the UE is scheduled via a single downlink control information (DCI) for multiple physical shared channel communications across multiple transmission time intervals and also multiple beams via multiple TCI states are indicated to the UE by at least one DCI codepoint; and
determine, in response to determining the UE is scheduled and indicated, a medium access control control element (MAC-CE) indication is used to trigger a switch from one TCI state to another TCI state from the set of TCI states that are indicated by the at least one DCI codepoint.

5. The UE of claim 1, wherein the at least one processor is configured to cause the UE to:
determine the UE is scheduled via single downlink control information (DCI) for multiple physical shared channel communications across multiple transmission time intervals and also indicated the multiple beams via the set of TCI states; and
determine, in response to determining the UE is scheduled and indicated, a first TCI state is applied for a first transmission time interval and following transmission time intervals unless a received signal strength for a reference signal with a same first TCI state reduces below a pre-configured threshold value.

6. The UE of claim 1, wherein the at least one processor is configured to cause the UE to:
determine the UE is scheduled via single downlink control information (DCI) for multiple physical shared channel communications across multiple transmission time intervals; and
determine, in response to determining the UE is scheduled, at least one DCI codepoint indicates two sets of TCI states, wherein each set of TCI states indicates a respective set of beams.

7. The UE of claim 1, wherein the at least one processor is configured to cause the UE to:
determine the UE is scheduled via single downlink control information (DCI) for multiple physical shared channel communications across multiple transmission time intervals; and
determine, in response to determining the UE is scheduled, at least one DCI codepoint indicates one set of TCI states, wherein the set of TCI states indicates only one set of beams.

8. The UE of claim 7, wherein TCI states within the one set of TCI states are shared between downlink reception and uplink transmission.

9. The UE of claim 7, wherein the at least one processor is configured to cause the UE to:
  determine the UE is capable of beam correspondence; and
  determine, in response to determining the UE is capable of the beam correspondence, a same TCI state is applied for both receiving downlink signals and transmitting uplink signals.

10. The UE of claim 9, wherein a periodicity or duration for each of the TCI states for each of the sets is also indicated by a same codepoint as a codepoint used for TCI state indication for both receiving downlink signals and transmitting uplink signals.

11. The UE of claim 9, wherein a medium access control control element (MAC-CE) indication is used to trigger a switch from one TCI state to another TCI state from the set of TCI states that are indicated by a downlink control information (DCI) codepoint for both receiving downlink signals and transmitting uplink signals.

12. The UE of claim 9, wherein the at least one processor is configured to cause the UE to:
  determine a received signal strength of a demodulation reference signal for physical channel communications is below at least one preconfigured threshold value; and
  trigger, in response to determining the received signal strength is below the at least one preconfigured threshold value, a switch from one TCI state to another TCI state from the set of TCI states that are indicated by a downlink control information (DCI) codepoint.

13. The UE of claim 1, wherein the at least one processor is further configured to cause the UE to receive, via RRC signalling, a configuration with a common beam or beam-set information that contains at least the location related information, an expected angle of arrival for downlink reception, and an expected angle of departure for uplink transmission.

14. A method performed by a user equipment (UE), the method comprising:
  receiving a configuration of multiple beams indicating a set of transmission configuration indicator (TCI) states and an indication of location related information, wherein the location related information indicates a first slot in which to apply a TCI state of the set of TCI states, and, wherein the multiple beams provide communication between the UE and a network entity;
  determining a set of the multiple beams to apply for communications based on at least the set of TCI states and the location related information; and
  communicating on different beams of the set of multiple beams at different time respective instances, wherein the respective time instances are based on at least the location related information and the set of TCI states.

15. A network entity for wireless communication, comprising:
  at least one memory; and
  at least one processor coupled with the at least one memory and configured to cause the network entity to:
    determine a configuration of multiple beams indicating a set of transmission configuration indicator (TCI) states and an indication of location related information, wherein the location related information indicates a first slot in which to apply a TCI state of the set of TCI states, and wherein the multiple beams provide communication between a user equipment (UE) and the network entity;
    transmit the configuration of the multiple beams and the indication of the location related information; and
    communicate on different beams of a set of multiple beams at different respective time instances, wherein the respective time instances are based on at least the location related information and the set of TCI states.

16. The network entity of claim 15, wherein the at least one processor is further configured to cause the network entity to implicitly indicate the location related information to the UE in terms of a starting time instance when a beam is to be applied for first time, a duration of validity of the beam, and a beam periodicity, wherein the beam periodicity corresponds to a periodicity for the UE to complete a cycle of movement.

17. The network entity of claim 15, wherein the at least one processor is configured to cause the network entity to:
  determine the UE is scheduled via a single downlink control information for multiple physical shared channel communications across multiple transmission time intervals and also indicated the multiple beams via the set of TCI states; and
  determine, in response to determining the UE is scheduled and indicated, an index of a TCI field that indicates the transmission time intervals for which each of the TCI states are valid.

18. The network entity of claim 15, wherein the at least one processor is configured to cause the network entity to:
  determine the UE is scheduled via a single downlink control information (DCI) for multiple physical shared channel communications across multiple transmission time intervals and also the multiple beams via the set of TCI states are indicated to the UE by at least one DCI codepoint; and
  determine, in response to determining the UE is scheduled and indicated, a medium access control control element (MAC-CE) indication is used to trigger a switch from one TCI state to another TCI state from the set of TCI states that are indicated by the at least one DCI codepoint.

19. The network entity of claim 15, wherein the at least one processor is configured to cause the network entity to:
  determine the UE is scheduled via single downlink control information for multiple physical shared channel communications across multiple transmission time intervals and also indicated the multiple beams via the set of TCI states; and
  determine, in response to determining the UE is scheduled and indicated, a first TCI state is applied for a first transmission time interval and following transmission time intervals unless a received signal strength for a reference signal with a same first TCI state reduces below a pre-configured threshold value.

20. A method performed by a network entity, the method comprising:
  determining a configuration of multiple beams indicating a set of transmission configuration indicator (TCI) states and an indication of location related information, wherein the location related information indicates a first slot in which to apply a TCI state of the set of TCI states, and wherein the beams provide communication between a user equipment (UE) and the network entity;
  transmitting the configuration of the multiple beams and the indication of the location related information; and
  communicating on different beams of a set of multiple beams at different respective time instances, wherein the respective time instances are based on at least the location related information and the set of TCI states.

* * * * *